US012777457B2

(12) United States Patent
Ernström et al.

(10) Patent No.: US 12,777,457 B2
(45) Date of Patent: Oct. 27, 2026

(54) METHODS, ACCESS NODE AND NETWORK NODE FOR ADDRESSING AMBIGUITIES IN ANGLE OF ARRIVAL ESTIMATION

(71) Applicant: TELEFONAKTIEBOLAGET LM ERICSSON (PUBL), Stockholm (SE)

(72) Inventors: Per Ernström, Stockholm (SE); Gustav Lindmark, Linköping (SE); Satyam Dwivedi, Solna (SE); Florent Munier, Västra Frölunda (SE); Yazid Lyazidi, Hasselby (SE); Fredrik Gunnarsson, Linköping (SE); Ritesh Shreevastav, Upplands Väsby (SE)

(73) Assignee: TELEFONAKTIEBOLAGET LM ERICSSON (PUBL, Stockholm (SE)

( * ) Notice: Subject to any disclaimer, the term of this patent is extended or adjusted under 35 U.S.C. 154(b) by 287 days.

(21) Appl. No.: 18/555,053

(22) PCT Filed: Apr. 12, 2022

(86) PCT No.: PCT/IB2022/053443
§ 371 (c)(1),
(2) Date: Oct. 12, 2023

(87) PCT Pub. No.: WO2022/219539
PCT Pub. Date: Oct. 20, 2022

(65) Prior Publication Data

US 2024/0205877 A1 Jun. 20, 2024

Related U.S. Application Data

(60) Provisional application No. 63/173,813, filed on Apr. 12, 2021.

(51) Int. Cl.
*H04W 24/10* (2009.01)
*H04L 5/00* (2006.01)
*H04W 64/00* (2009.01)

(52) U.S. Cl.
CPC ......... *H04W 64/006* (2013.01); *H04L 5/0051* (2013.01); *H04W 24/10* (2013.01)

(58) Field of Classification Search
CPC ..... H04W 4/029; H04W 24/10; H04W 64/00; H04W 64/006
See application file for complete search history.

(56) References Cited

U.S. PATENT DOCUMENTS

2020/0267026 A1 8/2020 Manolakos et al.
2020/0333427 A1* 10/2020 Hu ........................ H04W 24/10
(Continued)

FOREIGN PATENT DOCUMENTS

EP 3726896 A1 10/2020
WO 2019135105 A1 7/2019
(Continued)

OTHER PUBLICATIONS

3GPP TR 38.857 V1.1.0, "3rd Generation Partnership Project; Technical Specification Group Radio Access Network; Study on NR Positioning Enhancements; (Release 17)", Mar. 2021; 149 pages.
(Continued)

*Primary Examiner* — Sam Bhattacharya
(74) *Attorney, Agent, or Firm* — Ericsson Inc.

(57) ABSTRACT

Systems and methods for handling multiple Angle of Arrival (AoA) solutions and their associated ambiguities are provided herein. A network node instructs for a wireless device to transmit reference signals for positioning measurements. An access node can perform positioning measurements, including measuring a plurality of AoA values for the reference signals, and report the positioning measurements accordingly.

27 Claims, 13 Drawing Sheets

(56) References Cited

U.S. PATENT DOCUMENTS

| | | | |
|---|---|---|---|
| 2021/0048500 A1 | 2/2021 | Manolakos et al. |
| 2021/0099832 A1 | 4/2021 | Duan et al. |

FOREIGN PATENT DOCUMENTS

| | | |
|---|---|---|
| WO | 2020028517 A1 | 2/2020 |
| WO | 2020135266 A1 | 7/2020 |
| WO | 2021062858 A1 | 4/2021 |

OTHER PUBLICATIONS

3GPP TS 38.455 V16.2.0 (Jan. 2021), "3rd Generation Partnership Project; Technical Specification Group Radio Access Network; NG-RAN; NR Positioning Protocol A (NRPPa) (Release 16)", Jan. 2021; 151 pages 3GPP.

3GPP TS 38.473 V.16.4.0, TSG RAN; NG-RAN; F1 application protocol (F1AP) (Release 16),, Jan. 2021; 461 pages.

3GPP, 3rd Generation Partnership Project; Technical Specification Group Radio Access Network; Study on channel model for frequencies from 0.5 to 100 GHz (Release 16), TR 38.901 V16.1.0, Dec. 2019. (= ETSI TR 138 901 V16.1.0, Nov. 2020); 103 pages.

RP-210628, Intel Corporation et al., "Revised WID on NR Positioning Enhancements", 3GPP TSG RAN Meeting #91e, Mar. 16-26, 2022, Electronic Meeting; 7 pages.

International Search Report for PCT/IB2022/053443, mailing date of Jul. 7, 2022, 6 pages.

* cited by examiner

Figure 7.1.3-1: Orienting the LCS with respect to the GCS by a sequence of 3 rotations: $\alpha$, $\beta$, $\gamma$.

Figure 7.1.3-2: Definition of spherical coordinates and unit vectors in both the GCS and LCS.

METHODS, ACCESS NODE AND NETWORK NODE FOR ADDRESSING AMBIGUITIES IN ANGLE OF ARRIVAL ESTIMATION

CROSS REFERENCE TO RELATED APPLICATIONS

This application claims the benefit of U.S. Provisional Application No. 63/173,813 filed on Apr. 12, 2021, the entire contents of which are hereby incorporated by reference.

TECHNICAL FIELD

The present disclosure generally relates to wireless communications and wireless communication networks.

INTRODUCTION

Standardization bodies such as Third Generation Partnership Project (3GPP) are studying potential solutions for efficient operation of wireless communication in new radio (NR) networks. The next generation mobile wireless communication system 5G/NR will support a diverse set of use cases and a diverse set of deployment scenarios. The later includes deployment at both low frequencies (e.g. 100s of MHz), similar to LTE today, and very high frequencies (e.g. mm waves in the tens of GHz). Besides the typical mobile broadband use case, NR is being developed to also support machine type communication (MTC), ultra-low latency critical communications (URLCC), side-link device-to-device (D2D) and other use cases.

Positioning and location services have been topics in LTE standardization since 3GPP Release 9. An objective was to fulfill regulatory requirements for emergency call positioning but other use case like positioning for Industrial Internet of Things (I-IoT) are also important. Positioning in NR is proposed to be supported by the example architecture shown in FIG. 1. LMF 130A represents the location management function entity in NR. There are also interactions between the LMF 130A and the gNodeB (gNB) 120 via the NR Positioning Protocol A (NRPPa). The interactions between the gNodeB 120 and the device (UE) 110 are supported via the Radio Resource Control (RRC) protocol. LPP is common to both NR and LTE. Other network nodes, such as Access and Mobility Management Function (AMF) 130B and evolved Serving Mobile Location Center (e-SMLC) 130C, may be involved in positioning support.

Note 1: The gNB 120B and ng-eNB 120A may not always both be present.

Note 2: When both the gNB 120B and ng-eNB 120A are present, the NG-C interface is only present for one of them.

In the legacy LTE standards, the following techniques are supported:

- Enhanced Cell ID. Essentially cell ID information to associate the device to the serving area of a serving cell, and then additional information to determine a finer granularity position.
- Assisted GNSS. GNSS information retrieved by the device, supported by assistance information provided to the device from E-SMLC
- OTDOA (Observed Time Difference of Arrival). The device estimates the time difference of reference signals from different base stations and sends to the E-SMLC for multilateration.
- U-TDOA (Uplink TDOA). The device is requested to transmit a specific waveform that is detected by multiple location measurement units (e.g. an eNB) at known positions. These measurements are forwarded to E-SMLC for multilateration.

In NR Release 16, a number of positioning features were specified including reference signals, measurements, and positioning methods.

Reference Signals

A new downlink (DL) reference signal, the NR DL Positioning Reference Signal (PRS) was specified. A benefit of this signal in relation to the LTE DL PRS is increased bandwidth, configurable from 24 to 272 RBs, which can provide an improvement in time of arrival (TOA) accuracy. The NR DL PRS can be configured with a comb factor of 2, 4, 6 or 12. Comb-12 allows for twice as many orthogonal signals as the comb-6 LTE PRS. Beam sweeping is also supported on NR DL PRS in Release 16.

A new uplink (UL) reference signal based on the NR UL Sounding Reference Signal (SRS) was introduced and called "SRS for positioning". The Release 16 NR SRS for positioning allows for a longer signal, up to 12 symbols (compared to 4 symbols in Release 15 SRS), and a flexible position in the slot (only last six symbols of the slot can be used in Release 15 SRS). It also allows for a staggered comb RE pattern for improved TOA measurement range and for more orthogonal signals based on comb offsets (comb 2, 4 and 8) and cyclic shifts. The use of cyclic shifts longer than the Orthogonal Frequency Division Multiplexing (OFDM) symbol divided by the comb factor is, however, not supported by Release 16 despite that this is the main advantage of comb-staggering at least in indoor scenarios. Power control based on neighbor cell SSB/DL PRS is supported as well as spatial QCL relations towards a CSI-RS, an SSB, a DL PRS or another SRS.

Positioning Techniques

NR positioning supports the following methods:

Methods already in LTE, enhanced in NR, including:

- DL TDOA;
- E-CID;
- RAT-independent methods (based on non-3GPP sensors such as GPS, pressure sensors, Wifi signals, Bluetooth, etc.);
- UL TDOA.

Methods newly introduced in NR, including:

- Multicell round trip time (RTT), where the LMF collects RTT measurement(s) as the basis for multilateration;
- DL angle of departure (AoD) and UL angle of arrival (AA), where multilateration is done using angle and power (e.g. RSRP) measurements.

Measurements

In NR Rel. 16, the following UE measurements are specified:

- DL RSTD, allowing for e.g. DL TDOA positioning;
- Multi cell UE Rx-Tx Time Difference measurement, allowing for multi cell RTT measurements;
- DL PRS RSRP;

In NR Rel. 16, the following gNB measurements are specified:

- UL-RTOA, useful for UL TDOA positioning;
- gNB Rx-Tx time difference, useful for multi cell RTT measurements;
- UL SRS-RSRP;
- Azimuth-of-Arrival and Zenith-of-Arrival.

Signal Configurations

The DL PRS is configured by each cell separately, and the location server (LMF) collects all configuration via the NRPPa protocol, before sending an assistance data (AD) message to the UE via the LPP protocol. In the uplink, the SRS signal is configured in RRC by the serving gNB which, in turns, forward appropriate SRS configuration parameters to the LMF upon request.

In Release 17 (see 3GPP Positioning WID RP-210628), it was agreed to specify enhancements for the DL AoD and UL AoA methods. In UL AoA based methods, the LMF will indicate to the serving gNB the need to direct the UE to transmit SRS signals for uplink positioning. The UE transmits the SRS towards the gNB, and the gNB can measure the AoA of the SRS. The angle of arrival (AoA) of a signal is the direction from which the signal is received.

Existing Report Configuration

The NRPPa protocol provides some basic reporting means of UL AoA in section 9.2.38 of 3GPP TS 38.455, where a gNB can report the following information associated to UL AoA of a specific UE with respect to a specific Transmission/Reception Point (TRP) or NG-RAN access point position:

ing a plurality of AoA values for the reference signals. The access node transmits, to a network node, a positioning measurement response including the plurality of AoA values.

In another aspect there is provided a method performed by a network node. The network node can comprise a radio interface and processing circuitry and be configured to transmit an instruction for a wireless device to transmit reference signals for positioning measurements. The network node transmits, to an access node, a positioning measurement request. The network node receives, from the access node, a positioning measurement response including a plurality of AoA values.

In some embodiments, the plurality of AoA values are measured for one channel path. In other embodiments, the plurality of AoA values are measured for a plurality of channel paths.

| IE/Group Name | Presence | Range | IE Type and Reference | Semantics Description |
|---|---|---|---|---|
| Azimuth Angle of Arrival | M | | INTEGER(0 . . . 3599) | TS 38.133 [16] |
| Zenith Angle of Arrival | O | | INTEGER(0 . . . 1799) | TS 38.133 [16] |
| LCS to GCS Translation | | 0 . . . 1 | | If absent, the azimuth and zenith are provided in GCS. |
| >Alpha | M | | INTEGER (0 . . . 3599) | |
| >Beta | M | | INTEGER (0 . . . 3599) | |
| >Gamma | M | | INTEGER (0 . . . 3599) | |

where the LCS to GCS (Local Coordinate System to Global Coordinate System) translation is defined in TS 38.901 V.16.1.0 section 7.1.3, an excerpt of which is reproduced below:

7.1.3 Transformation from a LCS to a GCS

A GCS with coordinates (x, y, z, θ, φ) and unit vectors ($\hat{\theta}$, $\hat{\phi}$) and an LCS with "primed" coordinates (x', y', z', θ', φ') and "primed" unit vectors ($\hat{\theta}'$, $\hat{\phi}'$) are defined with a common origins in FIGS. 7.1.3-1 and 7.1.3-2. FIG. 7.1.3-1 illustrates the sequence of rotations that relate the GCS (gray) and the LCS (blue). FIG. 7.1.3-2 shows the coordinate direction and unit vectors of the GCS (gray) and the LCS (blue). Note that the vector fields of the array antenna elements are defined in the LCS. In FIG. 7.1.3-1 we consider an arbitrary 3D-rotation of the LCS with respect to the GCS given by the angles α, β, γ. The set of angles α, β, γ can also be termed as the orientation of the array antenna with respect to the GCS.

Note that the transformation from a LCS to a GCS depends only on the angles α, β, γ. The angle α is called the bearing angle, β is called the downtilt angle and γ is called the slant angle.

FIG. 2 illustrates 3GPP TS 38.901 V.16.1.0 FIGS. 7.1.3-1 and FIG. 7.1.3-2.

Conventionally, only one direction of arrival can be signaled from the gNB to the LMF.

SUMMARY

It is an object of the present disclosure to obviate or mitigate at least one disadvantage of the prior art.

There are provided systems and methods for handling ambiguous Angle of Arrival (AoA) mechanisms.

In a first aspect there is provided a method performed by an access node. The access node can comprise a radio interface and processing circuitry and be configured to transmit, to a wireless device, an instruction to transmit reference signals for positioning measurements. The access node performs positioning measurements including measur- In some embodiments, the access node can further receive, from the network node, a positioning measurement request indicating to measure the plurality of AoA values. The positioning measurement request includes an indicator to report measurements for an extended additional path list.

In some embodiments, the positioning measurement response includes the plurality of AoA values in at least one of an additional path list and/or an extended additional path list.

In some embodiments, the positioning measurement response includes at least one of: a Transmission/Reception Point measurement result information element, an uplink Relative Time of Arrival measurement information element, and/or a gNB Rx-Tx Time Difference measurement information element.

In some embodiments, performing positioning measurements can include estimating a phase estimate and an uncertainty associated with the phase estimate.

In some embodiments, the positioning measurement response is transmitted over NRPPa and/or F1AP protocols.

In some embodiments, the positioning measurement response includes one Local Coordinate System to Global Coordinate System (LCS to GCS) translation parameter for the plurality of AoA values.

In some embodiments, the network node can estimate a position of the wireless device in accordance with the positioning measurement response. In some embodiments, at least one of the plurality of AoA values is excluded when estimating the position of the wireless device.

The various aspects and embodiments described herein can be combined alternatively, optionally and/or in addition to one another.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures, wherein:

FIG. 11 is a block diagram of an example network node:

FIG. 12 is a block diagram of an example network node with modules; and

DETAILED DESCRIPTION

Figure 1:
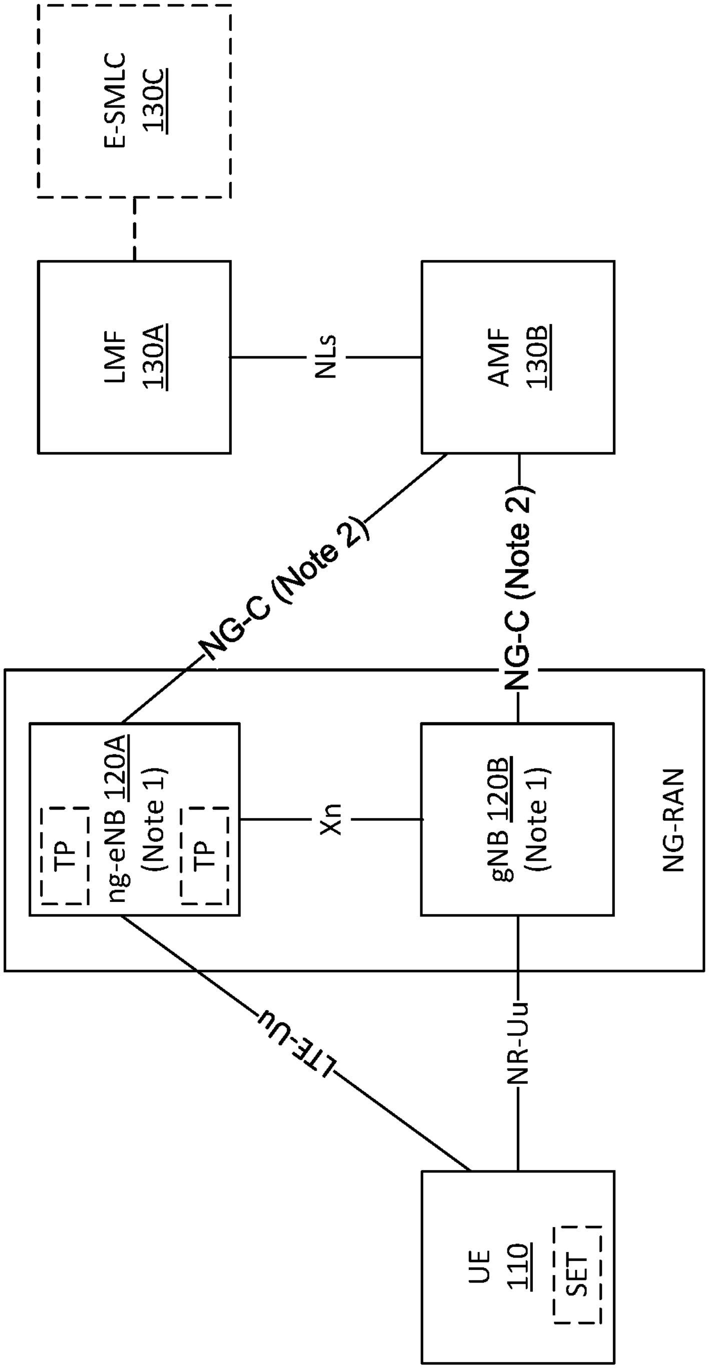
FIG. 1 illustrates an example of NR positioning architecture.
Figure 2:
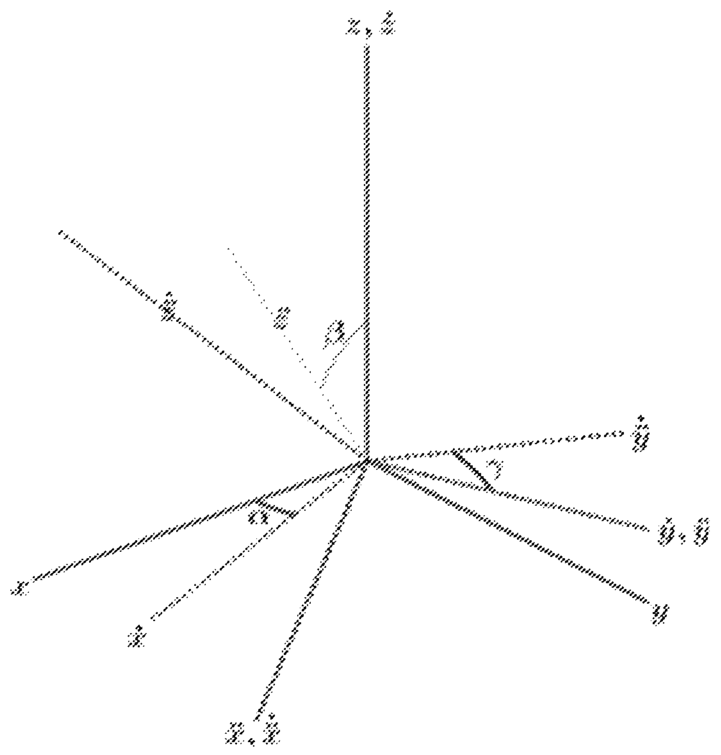
FIG. 2 illustrates 3GPP TS 38.901 V.16.1.0 FIGS. 7.1.3-1 and FIG. 7.1.3-2.
Figure 2:
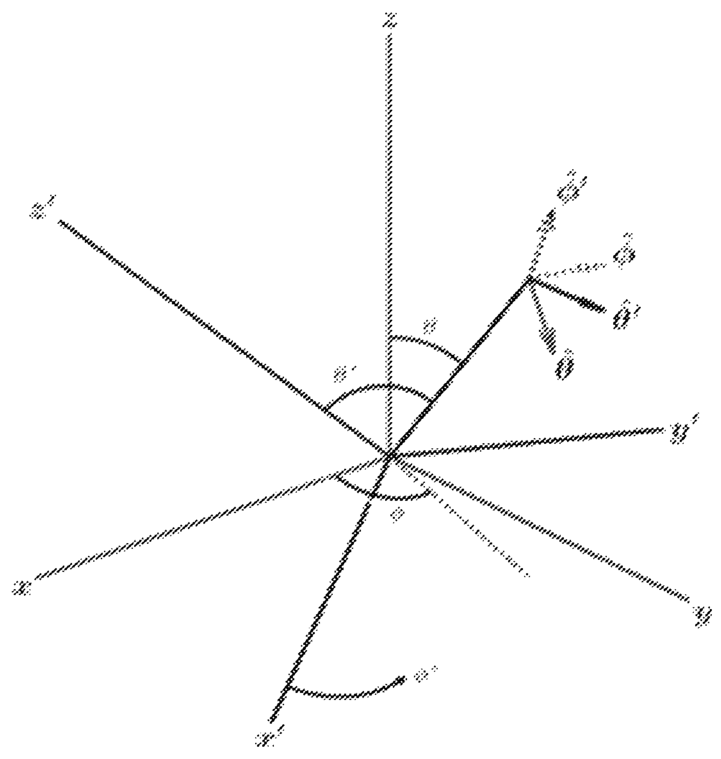
Figure 3A:
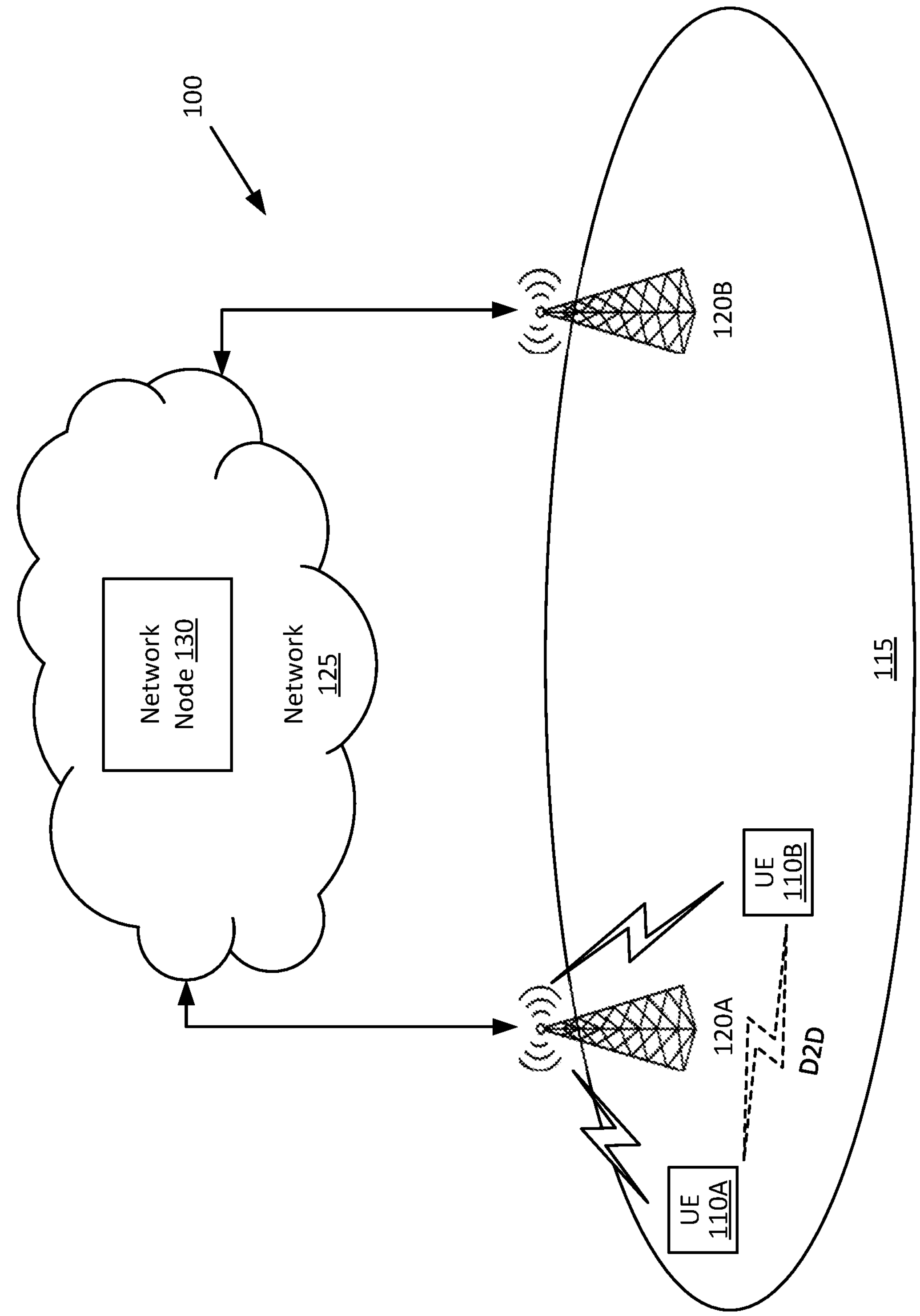
FIG. 3*a* illustrates an example wireless network.
Figure 3B:
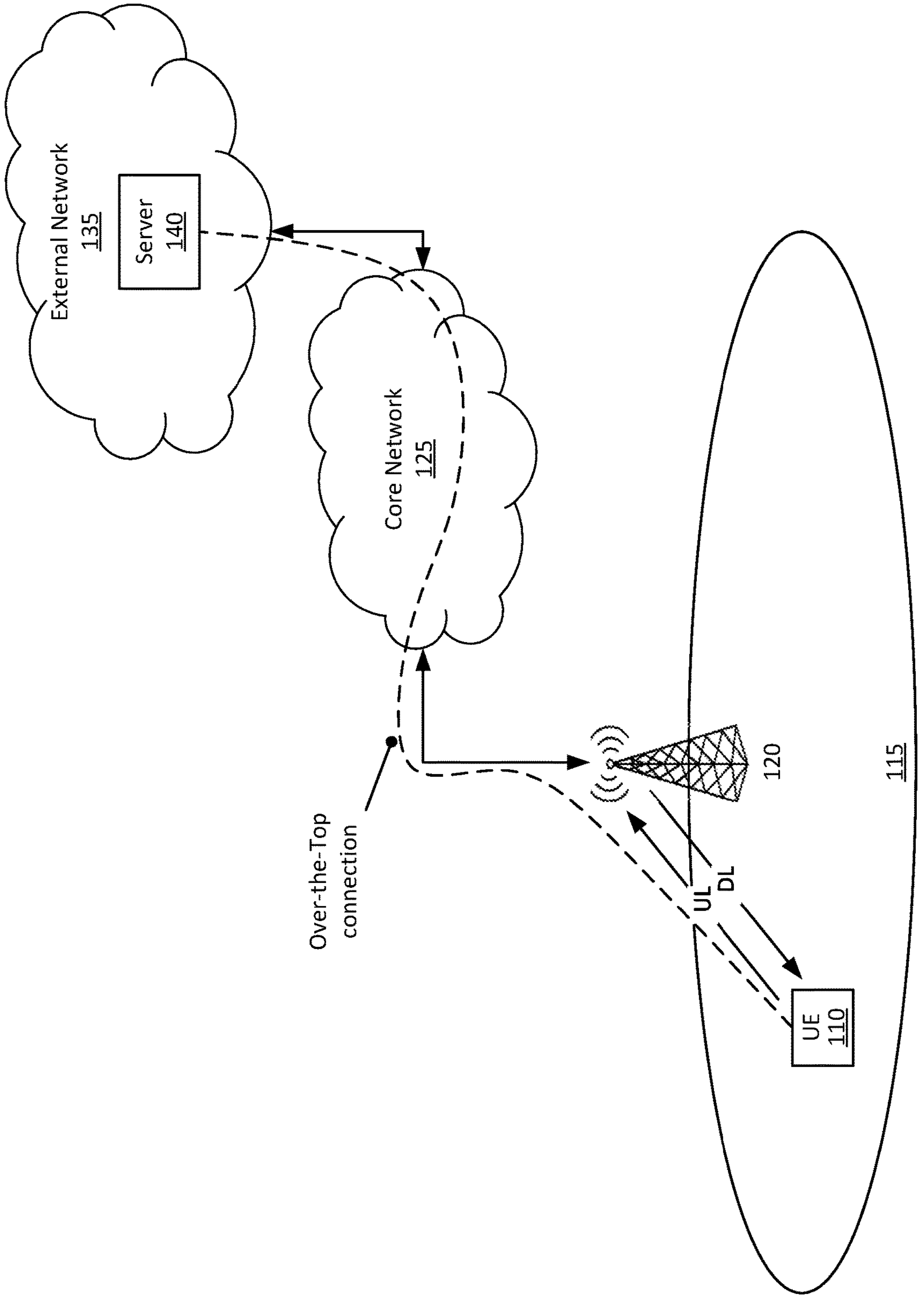
FIG. 3*b* illustrates an example of signaling in a wireless network.

The embodiments set forth below represent information to enable those skilled in the art to practice the embodiments. Upon reading the following description in light of the accompanying drawing figures, those skilled in the art will understand the concepts of the description and will recognize applications of these concepts not particularly addressed herein. It should be understood that these concepts and applications fall within the scope of the description.

In the following description, numerous specific details are set forth. However, it is understood that embodiments may be practiced without these specific details. In other instances, well-known circuits, structures, and techniques have not been shown in detail in order not to obscure the understanding of the description. Those of ordinary skill in the art, with the included description, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In some embodiments, the non-limiting term "user equipment" (UE) is used and it can refer to any type of wireless device which can communicate with a network node and/or with another UE in a cellular or mobile or wireless communication system. Examples of UE are target device, device to device (D2D) UE, machine type UE or UE capable of machine to machine (M2M) communication, personal digital assistant, tablet, mobile terminal, smart phone, laptop embedded equipped (LEE), laptop mounted equipment (LME), USB dongles, ProSe UE, V2V UE, V2X UE, MTC UE, eMTC UE, FeMTC UE, UE Cat 0, UE Cat M1, narrow band IoT (NB-IOT) UE, UE Cat NB1, etc. Example embodiments of a UE are described in more detail below with respect to FIG. 9.

In some embodiments, the non-limiting term "network node" is used and it can correspond to any type of radio access node (or radio network node) or any network node, which can communicate with a UE and/or with another network node in a cellular or mobile or wireless communication system. Examples of network nodes are NodeB, MeNB, SeNB, a network node belonging to MCG or SCG, base station (BS), multi-standard radio (MSR) radio access node such as MSR BS, eNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc.), O&M, OSS, Self-organizing Network (SON), positioning node (e.g. E-SMLC), MDT, test equipment, etc. Example embodiments of a network node are described in more detail below with respect to FIGS. 11 and 13.

In some embodiments, the term "radio access technology" (RAT) refers to any RAT e.g. UTRA, E-UTRA, narrow band internet of things (NB-IOT), WiFi, Bluetooth, next generation RAT (NR), 4G, 5G, etc. Any of the first and the second nodes may be capable of supporting a single or multiple RATs.

The term "radio node" used herein can be used to denote a wireless device or a network node.

In some embodiments, a UE can be configured to operate in carrier aggregation (CA) implying aggregation of two or more carriers in at least one of downlink (DL) and uplink (UL) directions. With CA, a UE can have multiple serving cells, wherein the term "serving" herein means that the UE is configured with the corresponding serving cell and may receive from and/or transmit data to the network node on the serving cell e.g. on PCell or any of the SCells. The data is transmitted or received via physical channels e.g. PDSCH in DL, PUSCH in UL, etc. A component carrier (CC) also interchangeably called as carrier or aggregated carrier, PCC or SCC is configured at the UE by the network node using higher layer signaling e.g. by sending RRC configuration message to the UE. The configured CC is used by the network node for serving the UE on the serving cell (e.g. on PCell, PSCell, SCell, etc.) of the configured CC. The configured CC is also used by the UE for performing one or more radio measurements (e.g. RSRP, RSRQ, etc.) on the cells operating on the CC, e.g. PCell, SCell or PSCell and neighboring cells.

In some embodiments, a UE can also operate in dual connectivity (DC) or multi-connectivity (MC). The multicarrier or multicarrier operation can be any of CA, DC, MC, etc. The term "multicarrier" can also be interchangeably called a band combination.

The term "radio measurement" used herein may refer to any measurement performed on radio signals. Radio measurements can be absolute or relative. Radio measurements can be e.g. intra-frequency, inter-frequency, CA, etc. Radio measurements can be unidirectional (e.g., DL or UL or in either direction on a sidelink) or bidirectional (e.g., RTT, Rx-Tx, etc.). Some examples of radio measurements: timing measurements (e.g., propagation delay, TOA, timing advance, RTT, RSTD, Rx-Tx, etc.), angle measurements (e.g., angle of arrival), power-based or channel quality measurements (e.g., path loss, received signal power, RSRP, received signal quality, RSRQ, SINR, SNR, interference power, total interference plus noise, RSSI, noise power, CSI, CQI, PMI, etc.), cell detection or cell identification, RLM, SI reading, etc. The measurement may be performed on one or more links in each direction, e.g., RSTD or relative RSRP or based on signals from different transmission points of the same (shared) cell.

The term "signaling" used herein may comprise any of high-layer signaling (e.g., via RRC or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

The term "time resource" used herein may correspond to any type of physical resource or radio resource expressed in terms of length of time. Examples of time resources include symbol, time slot, sub-frame, radio frame, TTI, interleaving time, etc. The term "frequency resource" may refer to sub-band within a channel bandwidth, subcarrier, carrier frequency, frequency band. The term "time and frequency resources" may refer to any combination of time and frequency resources.

Some examples of UE operation include: UE radio measurement (see the term "radio measurement" above), bidirectional measurement with UE transmitting, cell detection or identification, beam detection or identification, system information reading, channel receiving and decoding, any UE operation or activity involving at least receiving of one or more radio signals and/or channels, cell change or (re) selection, beam change or (re)selection, a mobility-related operation, a measurement-related operation, a radio resource management (RRM)-related operation, a positioning procedure, a timing related procedure, a timing adjustment related procedure, UE location tracking procedure, time tracking related procedure, synchronization related procedure, MDT-like procedure, measurement collection related procedure, a CA-related procedure, serving cell activation/deactivation, CC configuration/de-configuration, etc.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell". However, particularly with respect to 5G/NR concepts, beams may be used instead of cells and, as such, it is important to note that the concepts described herein are equally applicable to both cells and beams.

FIG. **3*a* illustrates an example of a wireless network 100 that can be used for wireless communications. Wireless network 100 includes wireless devices, such as UEs 110A-110B, and network nodes, such as radio access nodes 120A-120B (e.g. eNBs, gNBs, etc.), connected to one or more core network nodes 130 via an interconnecting network 125. The network 100 can use any suitable deployment scenarios. UEs 110 within coverage area 115 can each be capable of communicating directly with radio access nodes 120 over a wireless interface. In some embodiments, UEs 110** can also be capable of communicating with each other via D2D communication.

As an example, UE 110A can communicate with radio access node 120A over a wireless interface. That is, UE 110A can transmit wireless signals to and/or receive wireless signals from radio access node 120A. The wireless signals can contain voice traffic, data traffic, control signals, and/or any other suitable information. In some embodiments, an area of wireless signal coverage 115 associated with a radio access node 120 can be referred to as a cell.

The interconnecting network 125 can refer to any interconnecting system capable of transmitting audio, video, signals, data, messages, etc., or any combination of the preceding. The interconnecting network 125 can include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the network node 130 can be a core network node 130, managing the establishment of communication sessions and other various other functionalities for UEs 110. Examples of core network node 130 can include mobile switching center (MSC), MME, serving gateway (SGW), packet data network gateway (PGW), operation and maintenance (O&M), operations support system (OSS), SON, positioning node (e.g., Enhanced Serving Mobile Location Center, E-SMLC), location server node, MDT node, etc. UEs 110 can exchange certain signals with the core network node using the non-access stratum layer. In non-access stratum signaling, signals between UEs 110 and the core network node 130 can be transparently passed through the radio access network. In some embodiments, radio access nodes 120 can interface with one or more network nodes 130 over an internode interface.

In some embodiments, radio access node 120 can be a "distributed" radio access node in the sense that the radio access node 120 components, and their associated functions, can be separated into two main units (or sub-radio network nodes) which can be referred to as the central unit (CU) and the distributed unit (DU). Different distributed radio network node architectures are possible. For instance, in some architectures, a DU can be connected to a CU via dedicated wired or wireless link (e.g., an optical fiber cable) while in other architectures, a DU can be connected a CU via a transport network. Also, how the various functions of the radio access node 120 are separated between the CU(s) and DU(s) may vary depending on the chosen architecture.

FIG. **3*b* illustrates an example of signaling in wireless network 100. As illustrated, the radio interface generally enables the UE 110 and the radio access node 120 to exchange signals and messages in both a downlink direction (from the radio access node 120 to the UE 110) and in an uplink direction (from the UE 110 to the radio access node 120**).

The radio interface between the wireless device 110 and the radio access node 120 typically enables the UE 110 to access various applications or services provided by one or more servers 140 (also referred to as application server or host computer) located in an external network(s) 135. The connectivity between the UE 110 and the server 140, enabled at least in part by the radio interface between the UE 110 and the radio access node 120, can be described as an "over-the-top" (OTT) or "application layer" connection. In such cases, the UE 110 and the server 140 are configured to exchange data and/or signaling via the OTT connection, using the radio access network 100, the core network 125, and possibly one or more intermediate networks (e.g. a transport network, not shown). The OTT connection may be transparent in the sense that the participating communication devices or nodes (e.g., the radio access node 120, one or more core network nodes 130, etc.) through which the OTT connection passes may be unaware of the actual OTT connection they enable and support. For example, the radio access node 120 may not or need not be informed about the previous handling (e.g., routing) of an incoming downlink communication with data originating from the server 140 to be forwarded or transmitted to the UE 110. Similarly, the radio access node 120 may not or need not be aware of the subsequent handling of an outgoing uplink communication originating from the UE 110 towards the server 140.

Returning to positioning, as previously discussed, there may be issues related to ambiguities associated with angle of arrival (AoA) estimation. Currently only one direction of arrival can be signaled from the gNB to LMF. There may be multiple alternative directions due to ambiguities in the UL AoA estimation. DL AoA has not yet been specified in 3GPP, but the same problem exists may need to be addressed if/when DL AoA is specified.

Some embodiments described herein include mechanisms to handle ambiguous AoA solutions. This can include one or more of the signaling of estimated phase differences with uncertainty between consecutive antenna elements instead of the signaling of estimated AoA, the signaling of multiple AoA solutions with uncertainty, and/or the exclusion of solutions based on different criteria such as e.g. the coverage area of the antenna elements.

Phase Difference Estimation

When the distance between consecutive antenna elements in an antenna array is greater than the carrier wavelength divided by two there can be ambiguities in the AoA estimation. This can be considered an ambiguous solution.

Figure 4:
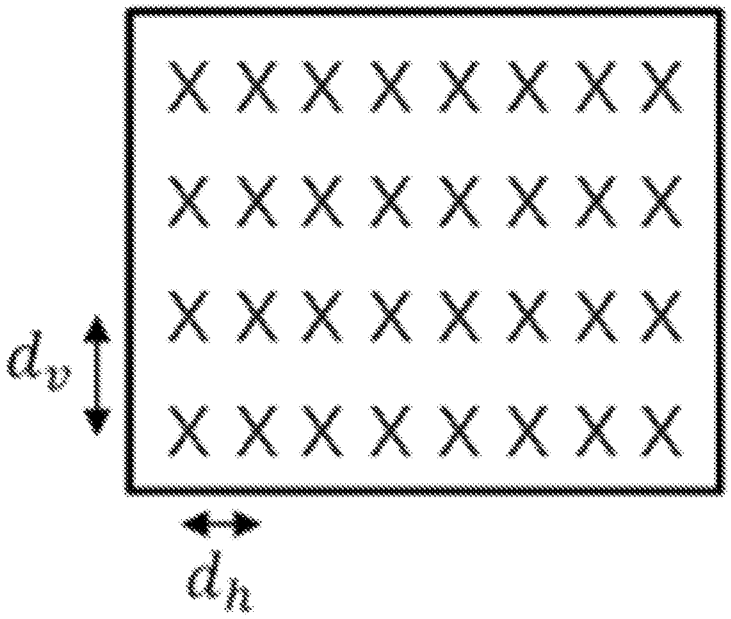
FIG. 4 illustrates an example planar two-dimensional antenna array.

FIG. 4 illustrates a planar two-dimensional antenna array. Assuming the array of FIG. 4, with distance $d_h$ between consecutive horizontal antenna elements and distance $d_v$ between consecutive vertical antenna elements. A local coordinate system is used with the x-axis coinciding with the horizontal direction of the antenna array, the z-axis coinciding with the vertical direction of the antenna array and the y-axis coinciding with the broadside direction of the antenna array. The direction from which the incoming signal is coming can be expressed as a unit vector:

$$\hat{r} = \sin\theta\cos\phi\hat{e}_x + \sin\theta\sin\phi\hat{e}_y + \cos\theta\hat{e}_z$$

using polar coordinates θ and ϕ. Generally, the phase difference due to the difference in propagation distance in the direction $\hat{r}$ between two antenna elements is:

$$\psi = 2\pi\frac{\bar{d}\cdot\hat{r}}{\lambda}$$

where $\bar{d}$ is the spatial vector between the two antenna elements.

Figure 5:
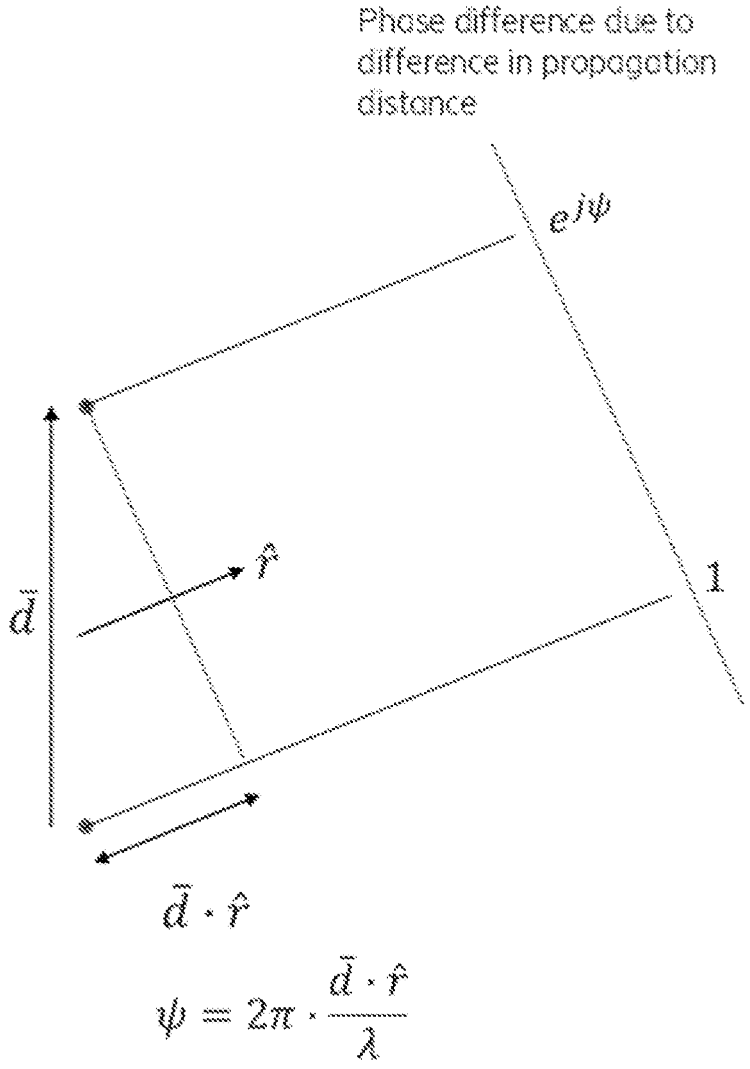
FIG. 5 illustrates an example phase difference due to the difference in propagation distance.

FIG. 5 illustrates the phase difference due to the difference in propagation distance in the direction $\hat{r}$ between two antenna elements separated by distance vector $\bar{d}$.

For the planar array antenna, the spatial vector $$\bar{d}_{n_1,n_2}$$

between antenna element $n_1$, $n_2$ and antenna element 1, 1 is given by:

$$\bar{d}_{n_1,n_2} = (n_1-1)d_h\hat{e}_y + (n_2-1)d_v\hat{e}_z$$

and the phase difference between antenna element $n_1$, $n_2$ and antenna element 1, 1 is given by:

$$\psi_{n_1,n_2} = 2\pi\left((n_1-1)\frac{d_h}{\lambda}\sin\theta\sin\phi + (n_2-1)\frac{d_v}{\lambda}\cos\theta\right) = (n_1-1)\psi_h + (n_2-1)\psi_v$$

$$\text{where } \psi_v = 2\pi\frac{d_v}{\lambda}\cos\theta$$

$$\text{and } \psi_h = 2\pi\frac{d_h}{\lambda}\sin\theta\sin\phi$$

are the phase differences between consecutive antenna elements in the vertical and horizontal directions.

The node performing the AoA estimation can estimate the phase differences between consecutive antenna elements in the vertical and horizontal directions, but only up to 2π (the received signal is affected by the phase factors $e^{i\psi_v}$ and $e^{i\psi_h}$). Thus, there are the following relations between the estimated phase differences between consecutive antenna elements in the vertical and horizontal directions and the direction of the incoming signal:

$$\psi_v^{est} + n\cdot 2\pi = \psi_v = 2\pi\frac{d_v}{\lambda}\cos\theta$$

$$\psi_h^{est} + n\cdot 2\pi = \psi_h = 2\pi\frac{d_h}{\lambda}\sin\theta\sin\phi$$

Due to the 2π ambiguity, this solution has multiple solutions when the distance between consecutive antenna elements in an antenna array is smaller than the carrier wavelength divided by two:

$$\theta_n = \cos^{-1}\left(\frac{\psi_v^{est} + n\cdot 2\pi}{2\pi\frac{d_v}{\lambda}}\right)$$

$$\phi_{n,m} = \sin^{-1}\left(\frac{\psi_h^{est} + m\cdot 2\pi}{2\pi\sin\theta_n\frac{d_v}{\lambda}}\right)$$

Here n and m can be any integers such that the absolute value of the arguments of the inverse cos and inverse sin are smaller than or equal to one. How many solutions exist depends on the distance between consecutive antenna elements in relation to the carrier wavelength.

The direction can be estimated in many ways but, independently of how they are estimated, multiple ambiguous solutions exist when the distance between consecutive antenna elements in an antenna array is smaller than the carrier wavelength divided by two.

An alternative method to find the directions is to:

1. Correlate the received signal at each antenna element with the known transmitted signal in the frequency domain.
2. Perform a 2D-DFT of received signal from antenna element space (2D since we have a 2D-antenna array) to beamspace. The 2D-DFT may be oversampled to improve accuracy.
3. Find the directions as local maxima in the power delay profile in beamspace.
4. Optionally, interpolate between nearby beams to improve accuracy.

Estimation of AoA can be performed separately for each channel path. This can be done by separating different paths in the channel impulse response in the time domain. The phase difference in the horizontal/vertical dimension can then be calculated as the average phase difference between the CIR evaluated at the identified path-delay between consecutive antenna elements in the horizontal/vertical dimension. Alternatively, the different paths can be separated as local maxima in the power delay profile of the CIR as calculated in 3D time-beamspace.

Some embodiments described herein can be used to handle AoA ambiguities for each channel path separately.

gNB Estimation and Signaling of Phases

The gNB (or gNB-DUs) estimates the phases $$\psi_v^{est} \text{ and } \psi_h^{est}.$$

The gNB (or gNB-CU, once it receives an indication over the F1 Application Protocol (F1AP)) signals the phases to the LMF over NRPPa.

In some embodiments, the gNB (or gNB-DUs) also estimates the uncertainties in the phase estimates $$\psi_v^{est} \text{ and } \psi_h^{est}.$$

The gNB (or gNB-CU, once it receives an indication over F1AP) signals the phase uncertainties together with the phase estimates to the LMF over NRPPa, e.g. as in an example signaling embodiment or, alternatively, by adding IEs for the phase differences and phase difference uncertainties in the UL Angle of Arrival IE.

In case of split gNB architecture, the phases estimation is performed by the gNB-DU(s), which signal the phase estimate (s) to the gNB-CU over F1AP. The gNB-CU signals the aggregated information from all DUs to the LMF.

A first example information element contains the uplink phase difference measurement parameters:

| IE/Group Name | Presence | Range | IE Type and Reference | Semantics Description |
|---|---|---|---|---|
| Horizontal_Phase_Difference | M | | INTEGER(0 . . . 3599) | TS 38.133 [16] |
| Vertical_Phase_Difference | O | | INTEGER(0 . . . 1799) | TS 38.133 [16] |
| Horizontal_Phase_Difference_Uncertainty | O | | INTEGER(0 . . . TBD) | |
| Vertical_Phase_Difference_Uncertainty | O | | INTEGER(0 . . . TBD) | |
| >Alpha | M | | INTEGER (0 . . . 3599) | Antenna array aligned LCS to GCS Translation |
| >Beta | M | | INTEGER (0 . . . 3599) | Antenna array aligned LCS to GCS Translation |
| >Gamma | M | | INTEGER (0 . . . 3599) | Antenna array aligned LCS to GCS Translation |

The LMF calculates one or more UL AoA solutions based on the phases $$\psi_v^{est} \text{ and } \psi_h^{est}$$

and supplementary information (see "Supplementary Information" section below) e.g. based on the above phase difference equations.

In some embodiments the LMF also calculates the uncertainties for the UL AoA solutions based on the uncertainties in the phase estimates $$\psi_v^{est} \text{ and } \psi_h^{est}$$

signaled to the LMF. In one embodiment this is done through a differential sensitivity analysis of the equations used (e.g. the above phase difference estimation equations and of any coordinate transformations used).

In some embodiments the LMF excludes some of the solutions based on some criteria (see "Exclusion of some solution(s)" section below).

In some embodiments all or part of the supplementary information is signaled to the LMF over an operations and maintenance interface.

In some embodiments all or part of the supplementary information is signaled by the gNB to the LMF over NRPPa.

In some embodiments, supplementary information is signalled over the F1 interface in split-gNB scenario.

The LMF use the UL AoA solutions (except excluded ones—if any) to position the UE. In some embodiments the LMF use the UL AoA solutions (except excluded ones—if any) together with other measurements and or information to position the UE. In some embodiments the LMF use also the uncertainties in the UL AoA solutions in positioning the UE.

gNB Signaling a Single Solution

The gNB (or gNB-DUs) can perform UL AoA estimation and identify one solution, e.g. based on the above phase difference estimation equations. It can be for example the direction closest to the broadside direction of the antenna array. The gNB (or gNB-CU once it receives an indication over F1AP) signals the solutions to the LMF over NRPPa.

In some embodiments, the gNB (or gNB-DUs) can also estimate the uncertainties in the UL AoA estimation. The gNB (or gNB-CU once it receives an indication over F1AP) signals the AoA estimation uncertainties together with the UL AoA estimate to the LMF over NRPPa, e.g. as in the second example information element containing the uplink Angle of Arrival measurement as follows:

| IE/Group Name | Presence | Range | IE Type and Reference | Semantics Description |
|---|---|---|---|---|
| Azimuth Angle of Arrival | M | | INTEGER(0 . . . 3599) | TS 38.133 [16] |
| Zenith Angle of Arrival | O | | INTEGER(0 . . . 1799) | TS 38.133 [16] |
| Azimuth AoA Uncertainty | O | | | |
| Zenith AoA Uncertainty | O | | | |
| LCS to GCS Translation | | 0 . . . 1 | | If absent and UL spatial direction information of the TRP is not provided, the azimuth and zenith are provided in GCS. |
| >Alpha | M | | INTEGER (0 . . . 3599) | |
| >Beta | M | | INTEGER (0 . . . 3599) | |
| >Gamma | M | | INTEGER (0 . . . 3599) | |

In this example, an Azimuth AoA Uncertainty parameter can be provided. If the LCS to GCS Translation IE is absent, and the UL spatial direction information of the TRP is not provide, the azimuth and zenith parameters can be provided in GCS.

The LMF can use the signaled UL AoA estimate together with supplementary information (see "Supplementary Information" section below) to calculate additional solutions if there are any.

In one embodiment, the LMF calculates the vertical and horizontal phase differences based on the signaled direction given by polar coordinates θ and ϕ in the local coordinate system aligned with the antenna array as:

$$\psi_v = 2\pi\frac{d_v}{\lambda}\cos\theta$$

$$\psi_h = 2\pi\frac{d_h}{\lambda}\sin\theta\sin\phi$$

and next finds all solutions based on $\psi_v$ and $\psi_h$, for example as:

$$\theta_n = \cos^{-1}\left(\frac{\psi_v^{est} + n\cdot 2\pi}{2\pi\frac{d_v}{\lambda}}\right)$$

-continued $$\phi_{n,m} = \sin^{-1}\left(\frac{\psi_h^{est} + m\cdot 2\pi}{2\pi\sin\theta_n\frac{d_v}{\lambda}}\right)$$

for all integers n and m such that the absolute value of the arguments of the inverse cos and inverse sin are smaller than or equal to one.

In some embodiments, the LMF can also calculate the uncertainties for the new UL AoA solutions based on the uncertainties for the UL AoA solution signaled to the LMF. In one embodiment, this is done through a differential sensitivity analysis of the equations above and of any coordinate transformations performed.

In some embodiments, the coordinate system used to represent the UL AoA to the LMF is not the local coordinate system aligned with the antenna array (it can be, for example, a local coordinate system not aligned with the antenna array or the GCS). In these embodiments, the coordinate transformation between the local coordinate system aligned with the antenna array and the coordinate system used to signal the UL AoA to the LMF is signaled to the LMF (e.g. as in the example signaling embodiment below). The LMF uses the coordinate transformation together with the single UL AoA solution to calculate all UL AoA solutions, e.g. by transforming the single UL AoA solution to the LCS aligned with the antenna array, using the formulas above and then transforming back to the original coordinate system.

A third example information element contains the uplink Angle of Arrival measurement:

| IE/Group Name | Presence | Range | IE Type and Reference | Semantics Description |
|---|---|---|---|---|
| Azimuth Angle of Arrival | M | | INTEGER(0 . . . 3599) | TS 38.133 [16] |
| Zenith Angle of Arrival | O | | INTEGER(0 . . . 1799) | TS 38.133 [16] |
| Azimuth AoA Uncertainty | O | | | |
| Zenith AoA Uncertainty | O | | | |
| LCS to GCS Translation | | 0 . . . 1 | | If absent and UL spatial direction information of the TRP is not provided, the azimuth and zenith are provided in GCS. |
| >Alpha | M | | INTEGER (0 . . . 3599) | |
| >Beta | M | | INTEGER (0 . . . 3599) | |
| >Gamma | M | | INTEGER (0 . . . 3599) | |

-continued

| IE/Group Name | Presence | Range | IE Type and Reference | Semantics Description |
|---|---|---|---|---|
| Aligned LCS to LCS Translation | | 0 . . . 1 | | If absent, the LCS is aligned with the antenna array. |
| >Alpha | M | | INTEGER (0 . . . 3599) | |
| >Beta | M | | INTEGER (0 . . . 3599) | |
| >Gamma | M | | INTEGER (0 . . . 3599) | |

In this example, the Aligned LCS to LCS Translation parameter(s) can be provided. If absent, it indicates the LCS is aligned with the antenna array.

In some embodiments the LMF excludes some of the solutions based on some criteria (see “Exclusion of some solution(s)” section below).

In some embodiments all or part of the supplementary information is signaled to the LMF over an operations and maintenance interface.

In some embodiments all or part of the supplementary information is signaled by the gNB to the LMF over NRPPa.

In some embodiments all or part of the supplementary information is signaled over the F1 interface in split-gNB scenario.

The LMF uses the UL AoA solutions (except excluded ones, if any) to position the UE. In some embodiments the LMF can use the UL AoA solutions (except excluded ones, if any) together with other measurements and or information to position the UE. In some embodiments the LMF also uses the uncertainties in the UL AoA solutions in positioning the UE.

gNB Signaling of Multiple Solutions

The gNB (or gNB-DUs) performs UL AoA estimation and identifies a number of alternative solutions, e.g. based on the above phase difference estimation equations.

In some embodiments the gNB (or gNB-DUs) also estimates the uncertainties for the UL AoA estimates. The gNB (or gNB-CU, once it receives an indication over F1AP) signals the UL AoA estimation uncertainties together with the UL AoA estimates to the LMF over NRPPa.

In some embodiments the gNB excludes some of the solutions based on some criteria (see “Exclusion of some solution(s)” section below).

The gNB (or gNB-CU) can signal a number of alternative solutions to the LMF over NRPPa. A fourth example information element contains the list of the additional uplink Angle of Arrival measurements:

| IE/Group Name | Presence | Range | IE Type and Reference | Semantics Description |
|---|---|---|---|---|
| Additional AoA item | | 1 . . . <maxnoofAddAoAs> | | |
| >Angle of Arrival Report | M | | 9.2.38 | ] |
| >Phase difference | O | | 9.X.Y | |

| Range bound | Explanation |
|---|---|
| maxnoofAddAoAs | Maximum no of additional AoAs that can be reported. |

In some embodiments the LMF excludes some of the solutions based on some criteria (see “Exclusion of some solution(s)” section below).

The LMF does not need the basic supplementary information to calculate additional UL AoA estimates (since the solutions are signaled from the gNB) but in some embodiments supplementary information is still needed, for example, to exclude some solutions.

In some embodiments supplementary information is signaled to the LMF over an operations and maintenance interface.

In some embodiments supplementary information is signaled by the gNB to the LMF over NRPPa.

In some embodiments, supplementary information is signaled over the F1 interface in split-gNB scenario.

The LMF uses the UL AoA solutions (except excluded ones, if any) to position the UE. In some embodiments the LMF use the UL AoA solutions (except excluded ones, if any) together with other measurements and or information to position the UE.

UE Estimation and Signaling of Phases

The UE estimates the phases $$\psi_v^{est} \text{ and } \psi_h^{est}$$

and signals them to the LMF over LPP.

In some embodiments the UE also estimates the uncertainties in the phase estimates $$\psi_v^{est} \text{ and } \psi_h^{est}$$

and signals the phase uncertainties together with the phase estimates to the LMF over LPP.

In some embodiments the UE has multiple antenna panels and includes an indication of which antenna panel that has been used for the phase estimates in the signaling of the phase estimates to the LMF. The UE also signal the orientation of the different antenna panels in a UE LCS to the LMF, e.g. as part of capability signaling.

The LMF calculates one or more DL AoA solutions based on the phases $$\psi_v^{est} \text{ and } \psi_h^{est}$$

and supplementary information (see "Supplementary Information" section below) e.g. based on the above phase difference estimation equations.

In some embodiments the LMF also calculates the uncertainties for the DL AoA solutions based on the uncertainties in the phase estimates $$\psi_v^{est} \text{ and } \psi_h^{est}$$

signaled to the LMF. In one embodiment this is done through a differential sensitivity analysis of the equations used (e.g. the above phase difference equations and of any coordinate transformations used).

In some embodiments the UE signals some or all of the supplementary information to the LMF over LPP, e.g. as UE capability information.

In some embodiments the LMF excludes some of the solutions.

The LMF use the DL AoA solutions (except excluded ones, if any) to position the UE. In some embodiments the LMF use the DL AoA solutions (except excluded ones—if any) together with other measurements and or information to position the UE. In some embodiments the LMF also uses the uncertainties in the DL AoA solutions in positioning the UE.

UE Signaling a Single Solution

The UE performs DL AoA estimation and identifies one solution, e.g. based on the above phase difference estimation equations. It can be for instance the direction closest to the broadside direction of the antenna array. The UE signals the solution to the LMF over NRPPa.

In some embodiments the UE also estimates the uncertainties in DL AoA estimate and signals the uncertainties together with the DL AoA estimate to the LMF over LPP.

In some embodiments the UE has multiple antenna panels and includes an indication of which antenna panel that has been used for the DL AoA estimates in the signaling of the DL AoA estimates to the LMF. In some embodiments the UE also signal the orientation of the different antenna panels in a UE LCS to the LMF, e.g. as part of capability signaling.

The LMF use the signaled DL AoA estimate together with supplementary information (see "Supplementary Information" section below) to calculate additional solutions if there are any.

In one embodiment the LMF calculates the vertical and horizontal phase differences based on the signaled direction given by polar coordinates $\theta$ and $\phi$ as:

$$\psi_v = 2\pi\frac{d_v}{\lambda}\cos\theta$$

$$\psi_h = 2\pi\frac{d_h}{\lambda}\sin\theta\sin\phi$$

and next finds all solutions based on $\psi_v$ and $\psi_h$, for example as:

$$\theta_n = \cos^{-1}\left(\frac{\psi_v^{est} + n\cdot 2\pi}{2\pi\frac{d_v}{\lambda}}\right)$$

$$\phi_{n,m} = \sin^{-1}\left(\frac{\psi_h^{est} + m\cdot 2\pi}{2\pi\sin\theta_n\frac{d_v}{\lambda}}\right)$$

for all integers n and m such that the absolute value of the arguments of the inverse cos and inverse sin are smaller than or equal to one.

In one embodiment the LMF adds $k\cdot 2\pi$ to $\psi_v$ and adds $l\cdot 2\pi$ to $\psi_h$ selecting integers k and l so that the resulting $\psi_v$ and $\psi_h$ both lie between $-\pi$ and $\pi$, before calculating solutions $\theta_n$, $\phi_{n,m}$.

In some embodiments the LMF also calculates the uncertainties for the new DL AoA solutions based on the uncertainties for the DL AoA solution signaled to the LMF. In one embodiment this is done through a differential sensitivity analysis of the equations above and of any coordinate transformations performed.

In some embodiments the LMF excludes some of the solutions based on some criteria (see "Exclusion of some solution(s)" section below).

In some embodiments all or part of the supplementary information is signaled to the LMF over an operations and maintenance interface.

In some embodiments all or part of the supplementary information is signaled by the UE to the LMF over LPP.

The LMF use the DL AoA solutions (except excluded ones, if any) to position the UE. In some embodiments the LMF use the DL AoA solutions (except excluded ones, if any) together with other measurements and or information to position the UE. In some embodiments the LMF also uses the uncertainties in the DL AoA solutions in positioning the UE.

UE Signaling of Multiple Solutions

The UE performs DL AoA estimation and identifies a number of alternative solutions, e.g. based on the above phase difference estimation equations. In some embodiments the UE excludes some of the solutions based on some criteria.

The UE signals a number of alternative solutions to the LMF over LPP.

In some embodiments the UE also estimates the uncertainties for the DL AoA estimates and signals the DL AoA estimation uncertainties together with the DL AoA estimates to the LMF over LPP.

In some embodiments the UE has multiple antenna panels and includes an indication of which UE antenna panel that has been used for the DL AoA estimates in the signaling of the DL AoA estimates to the LMF. In some embodiments the UE can also signal the orientation of the different UE antenna panels in a UE LCS to the LMF, e.g. as part of capability signaling.

In some embodiments the LMF excludes some of the solutions based on some criteria.

The LMF uses the DL AoA solutions (except excluded ones, if any) to position the UE. In some embodiments the LMF use the DL AoA solutions (except excluded ones, if any) together with other measurements and or information to position the UE. In some embodiments the LMF also uses the uncertainties in the DL AoA solutions in positioning the UE.

Exclusion of Some Solution(s)

In some embodiments some of the identified solutions for the AoA are excluded based on some criteria such as e.g. that:

- The AoA is outside the coverage area of the antenna elements where the coverage area may be defined as directions for which the antenna diagram for the antenna elements is weaker than some threshold.
- The AoA is outside the sector covered by the antenna array.

In some embodiments, the exclusion criteria is based on information (e.g. a threshold or an indication of what criteria or multiple criteria to use) signaled from the LMF to gNB over NRPPa or to the UE over LPP.

Supplementary Information

The supplementary information may be divided into basic supplementary information and other supplementary information.

The basic supplementary information is needed to calculate AoA from the received signals or from phase difference estimates based on the received signals. The basic supplementary information is also needed to calculate the phase differences from an AoA estimate.

The additional supplementary information may e.g. comprise information that allows exclusion of some AoA solutions.

Basic Supplementary Information

In one embodiment the basic supplementary information comprises:

1. The distance between consecutive antenna elements in the horizontal direction in the antenna array
2. The distance between consecutive antenna elements in the vertical direction in the antenna array
3. The carrier wavelength In another embodiment the basic supplementary information comprises:

1. The distance between consecutive antenna elements in the horizontal direction in the antenna array
2. The distance between consecutive antenna elements in the vertical direction in the antenna array
3. The carrier frequency In yet another embodiment the basic supplementary information comprises:

1. The distance between consecutive antenna elements in the horizontal direction in the antenna array divided by the carrier wavelength
2. The distance between consecutive antenna elements in the vertical direction in the antenna array divided by the carrier wavelength In yet another embodiment the basic supplementary information comprises for each of a number of antenna panels:

1. The distance between consecutive antenna elements in the horizontal direction in the antenna array divided by the carrier wavelength
2. The distance between consecutive antenna elements in the vertical direction in the antenna array divided by the carrier wavelength
3. The orientation of the antenna panel relative to the LCS Other Supplementary Information In some embodiments the other supplementary information comprises one or more of:

1. The antenna diagram of the antenna elements
2. The directional coverage area of the antenna elements or the node (as can be defined by an area on the unit-sphere and signaled e.g. by an interval in the azimuth angle and an interval in the zenith angle)

Virtual Antenna Elements

In some embodiments the antenna elements are virtual antenna elements made up from a number of real antenna elements with fixed precoder weights. The AoA estimator does only have access to the received signal at the virtual antenna elements. The distance between consecutive antenna elements is then the distance between consecutive virtual antenna elements.

Coordinate Systems and AoA Reports

In the current specification, any translation between local and global coordinates has to be provided with every UL AoA report. In one embodiment, a local to global coordinate translation is provided once for subsequent coordinate translations of AoA reports within the TRP Information Type IE.

The TRP Information IE contains information for one TRP within an NG-RAN node:

| IE/Group Name | Presence | Range | IE Type and Reference | Semantics Description |
|---|---|---|---|---|
| TRP ID | M | | 9.2.24 | |
| TRP Information Type | | 1 . . . <maxnoTRPInfoTypes> | | |
| >CHOICE TRP Information Item | M | | | |
| >>NR PCI | M | | INTEGER (0 . . . 1007) | NR Physical Cell ID |
| >>NR CGI | M | | 9.2.9 | |
| >>NR ARFCN | M | | INTEGER (0 . . . 3279165) | |
| >>PRS Configuration | M | | 9.2.44 | |
| >>SSB Information | M | | 9.2.54 | |
| >>SFN Initialisation Time | M | | 9.2.36 | |
| >>Spatial Direction Information | M | | 9.2.45 | |
| >>Geographical Coordinates | M | | 9.2.46 | |
| >>UL spatial direction information | M | | 9.2.45a | The spatial direction information associated to the UL reports |

The example TRP Information IE above includes a UL spatial direction information IE. This UL spatial direction information IE can contain spatial direction information associated to UL measurement reports:

| IE/Group Name | Presence | Range | IE type and reference | Semantics description |
|---|---|---|---|---|
| Alpha | M | | INTEGER (0 . . . 359) | |
| Alpha-fine | O | | INTEGER (0 . . . 9) | Fine angles |
| Beta | M | | INTEGER (0 . . . 359) | |
| Beta-fine | O | | INTEGER (0 . . . 9) | Fine angles |
| Gamma | M | | INTEGER (0 . . . 359) | |
| Gamma-fine | O | | INTEGER (0 . . . 9) | Fine angles |

In other embodiments, the UL AoA spatial direction information can be signaled at other IE levels within the TRP information exchange procedure, such as within the Spatial Direction Information.

In some embodiments the LMF excludes some of the solutions based on some criteria (see "Exclusion of some solution(s)" section above).

In some embodiments all or part of the supplementary information is signaled to the LMF over an operations and maintenance interface.

In some embodiments all or part of the supplementary information is signaled by the gNB to the LMF over NRPPa.

In some embodiments, supplementary information is signaled over the F1 interface, in the F1AP positioning messages, in split-gNB scenario.

Signaling Phase Difference Measurements

The following example provides NRPPa signaling information to illustrate how phase difference measurements can be provided.

A measurement request message is sent by the LMF to request the NG-RAN node to configure a positioning measurement. The direction of signaling is from the LMF to the NG-RAN node.

| IE/Group Name | Presence | Range | IE type and reference | Semantics description | Criticality | Assigned Criticality |
|---|---|---|---|---|---|---|
| Message Type | M | | 9.2.3 | | YES | reject |
| NRPPa Transaction ID | M | | 9.2.4 | | — | |
| LMF Measurement ID | M | | INTEGER (1 . . . 65536, . . .) | | YES | reject |
| TRP Measurement Request List | | 1 | | | YES | reject |
| >TRP Measurement Request Item | | 1 . . . <maxnoofMeasTRPs> | | | EACH | reject |
| >>TRP ID | M | | 9.2.24 | | YES | |
| >>Search Window Information | O | | 9.2.26 | | YES | |
| >>Cell ID | O | | NR CGI 9.2.9 | The Cell ID of the TRP identified by the TRP ID IE. | YES | ignore |
| Report Characteristics | M | | ENUMERATED (OnDemand, Periodic, . . .) | | YES | reject |
| Measurement Periodicity | C-ifReportCharacteristicsPeriodic | | ENUMERATED (120 ms, 240 ms, 480 ms, 640 ms, 1024 ms, 2048 ms, 5120 ms, 10240 ms, 1 min, 6 min, 12 min, 30 min, 60 min, . . ., 20480 ms, 40960 ms) | The codepoint 60 min is not applicable | YES | reject |
| TRP Measurement Quantities | | 1 | | | YES | reject |
| >TRP Measurement Quantities Item | | 1 . . . <maxno? osMeas> | | | EACH | reject |
| >TRP Measurement Type | M | | ENUMERATED (gNB-RxTxTimeDiff, UL-SRS-RSRP, UL-AoA, UL-RTOA, . . . phase_difference) | | YES | |
| >Timing Reporting Granularity Factor | O | | INTEGER (0..5) | TS 38.133 [16] | YES | |
| SFN initialisation Time | O | | 9.2.36 | If this IE is not present, the TRP may assume that the value is same as its own SFN initialisation time. | YES | ignore |
| SRS Configuration | O | | 9.2.28 | | YES | ignore |
| Measurement Beam Information Request | C | | ENUMERATED (true, . . .) | | YES | ignore |
| System Frame Number | O | | INTEGER(0 . . . 1023) | | YES | ignore |
| Slot Number | O | | INTEGER(0 . . . 79) | | YES | ignore |

| Condition | Explanation |
|---|---|
| ifReportCharacteristicsPeriodic | This IE shall be present if the Report Characteristics IE is set to the value "Periodic". |

| Range bound | Explanation |
|---|---|
| maxnoPosMeas | Maximum no. of measured quantities that can be configured and reported with one positioning measurement message. Value is 16384. |
| maxnoofMeasTRPs | Maxmum no. of TRPs that can be included within one message. Value is 64. |

```
TrpMeasuredResultsValue ::=            CHOICE {
   uL-AngleOfArrival                  UL-AoA,
   uL-SRS-RSRP                        UL-SRS-RSRP,
   uL-RTOA                            UL-RTOAMeasurement,
   qNB-RxTxTimeDiff                   GNB-RxTxTimeDiff,
   choice-extension                          ProtocolIE-Single-Container { {
TrpMeasuredResultsValue-ExtIEs } }
}
TrpMeasuredResultsValue-ExtIEs         NRPPA-PROTOCOL-IES ::= {
   phaseDifferenceMeasurement               PhaseDifferenceMeasurement
   ...
}
PhaseDifferenceMeasurement ::= {
   horizontalPhaseDifference           INTEGER          (0..3599),
   verticalPhaseDifference             INTEGER            (0..3599),
}
```

In this example, a phase difference IE can be provided in the TRP Measurement Type. In the above, the horizontalPhaseDifference and the verticalPhaseDifference parameters are given in tenths of degrees.

Additional Path List Reporting for UL AoA

In a separate embodiment, UL AoA are added to additional paths. Two alternatives for this addition can be considered:

In one embodiment an additional path IE is added to UL AoA and includes UL AoAs per path; or In another embodiment, an UL AoA IE is added as an optional part to the existing measurements RTOA and gNB RxTx.

This embodiment can be combined with the embodiments for handling UL AoA ambiguities in such a way that ambiguities are handled both for the first path and for the additional paths.

The following discussion presents a non-limiting example of: 1) the first option of adding the additional path list IE to the UL AoA IE in 3GPP TS 38.455, and 2) adding the Azimuth Angle of Arrival and Zenith Angle of Arrival in the additional path list IE, either in a specific Additional Path AoA IE, or as defined in the "gNB signaling a single solution" section above. This example builds on the legacy AoA IE existing in 3GPP TS 38.455.

The UL Angle of Arrival information element contains the uplink Angle of Arrival measurement:

| IE/Group Name | Presence | Range | IE Type and Reference | Semantics Description |
|---|---|---|---|---|
| Azimuth Angle of Arrival | M | | INTEGER(0 . . . 3599) | TS 38.133 [16] |
| Zenith Angle of Arrival | O | | INTEGER(0 . . . 1799) | TS 38.133 [16] |
| LCS to GCS Translation | | 0 . . . 1 | | If absent, the azimuth and zenith are provided in GCS. |
| >Alpha | M | | INTEGER (0 . . . 3599) | |
| >Beta | M | | INTEGER (0 . . . 3599) | |
| >Gamma | M | | INTEGER (0 . . . 3599) | |
| Additional Path List | O | | 9.2.41 | |

The Additional Path List information element contains the additional path results of time measurement:

| IE/Group Name | Presence | Range | IE Type and Reference | Semantics Description |
|---|---|---|---|---|
| Additional Path Item | | 1 . . . <maxnopath> | | |
| >CHOICE Relative Path Delay | M | | | |
| >>k0 | M | | INTEGER(0 . . . 16351) | |
| >>k1 | M | | INTEGER(0 . . . 8176) | |
| >>k2 | M | | INTEGER(0 . . . 4088) | |
| >>k3 | M | | INTEGER(0 . . . 2044) | |
| >>k4 | N | | INTEGER(0 . . . 1022) | |
| >>k5 | M | | INTEGER(0 . . . 511) | |
| >Path Quality | O | | Measurement Quality 9.2.43 | |
| Azimuth Angle of Arrival | M | | INTEGER(0 . . . 3599) | TS 38.133 [16] |

-continued

| IE/Group Name | Presence | Range | IE Type and Reference | Semantics Description |
|---|---|---|---|---|
| Zenith Angle of Arrival | O | | INTEGER(0 . . . 1799) | TS 38.133 [16] |
| Azimuth AoA Uncertainty | O | | | |
| Zenith AoA Uncertainty | O | | | |

| Range bound | Explanation |
|---|---|
| maxnopath | Maximum no. of additional path measurement. Value is 2. |

In some embodiments, supplementary information can be signaled over the F1 interface, in the F1AP positioning messages, in split-gNB scenario.

Figure 6:
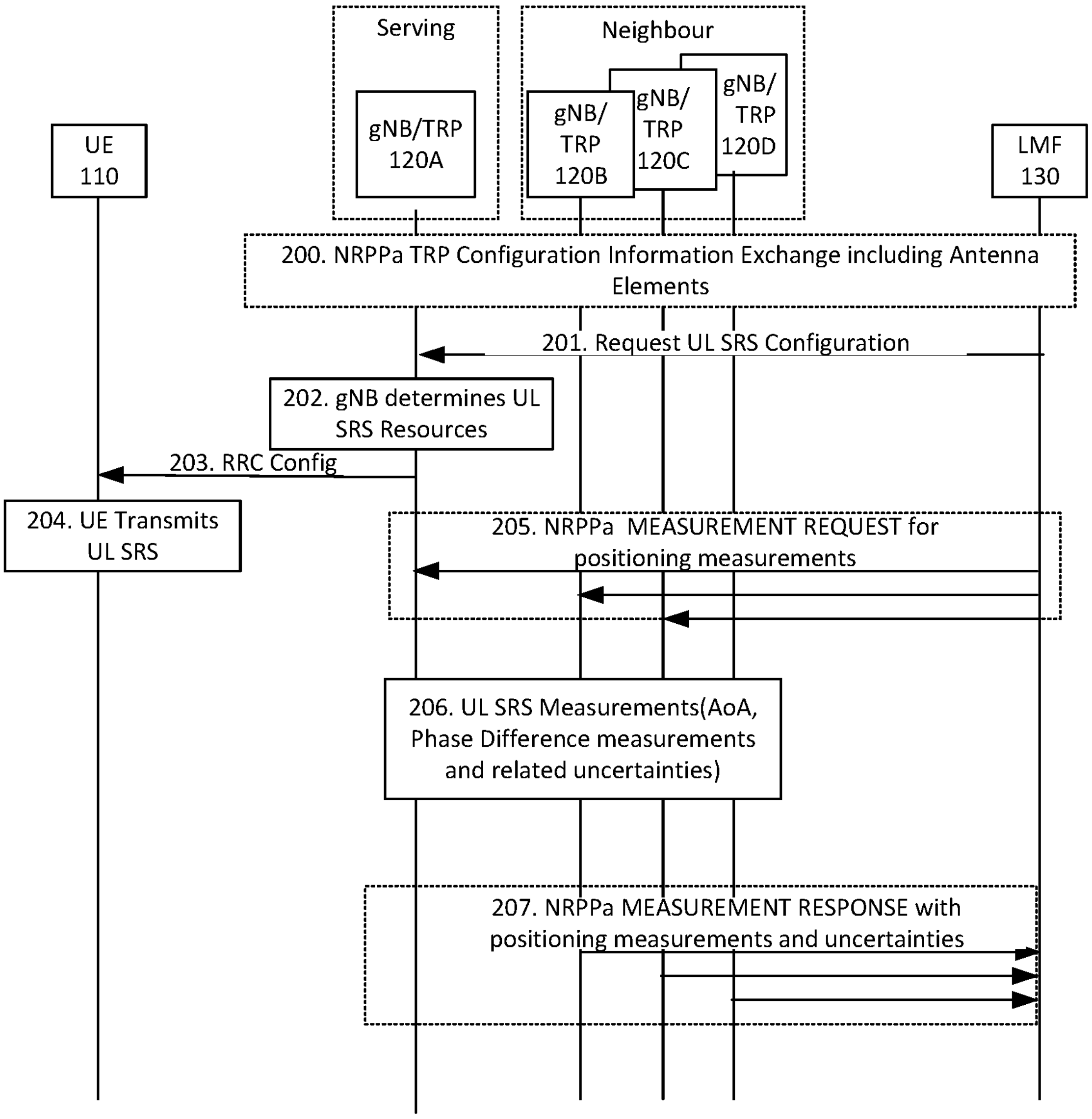
FIG. 6 is a signaling diagram.

FIG. 6 is a signaling diagram illustrating an embodiment where positioning measurements are requested by the LMF 130 and provided by one or more different gNBs/TRPs 120 to the LMF 130 for mitigating issues associated with AoA measurements and thus yielding high accuracy positioning.

In step 200, optionally, configuration information is exchanged between the nodes, including antenna elements. The exchange can be via the NRPPa protocol. The LMF 130 transmits a request UL SRS Configuration message to gNB 120A (step 201). gNB 120A determines the UL SRS resources (step 202) and transmits RRC configuration information to UE 110 (step 203). The UE then transmits the UL SRS (step 204).

LMF 130 can optionally transmit one or more measurement request messages for phase difference measurements to one or more gNBs 120 (step 205). The measurement request can be transmitted via the NRPPa protocol. The gNB(s) 120 perform UL SRS measurements (step 206) which can include AoA measurements, phase difference measurements and determining uncertainties/ambiguities related to the AoA and/or phase difference as described in the various embodiments herein. In step 207, optionally, the gNB(s) 120 can transmit a measurement response message to the LMF 130 including the measurements and an indication of the associated uncertainty/ambiguity. The measurement response message can be transmitted via the NRPPa protocol.

Figure 7:
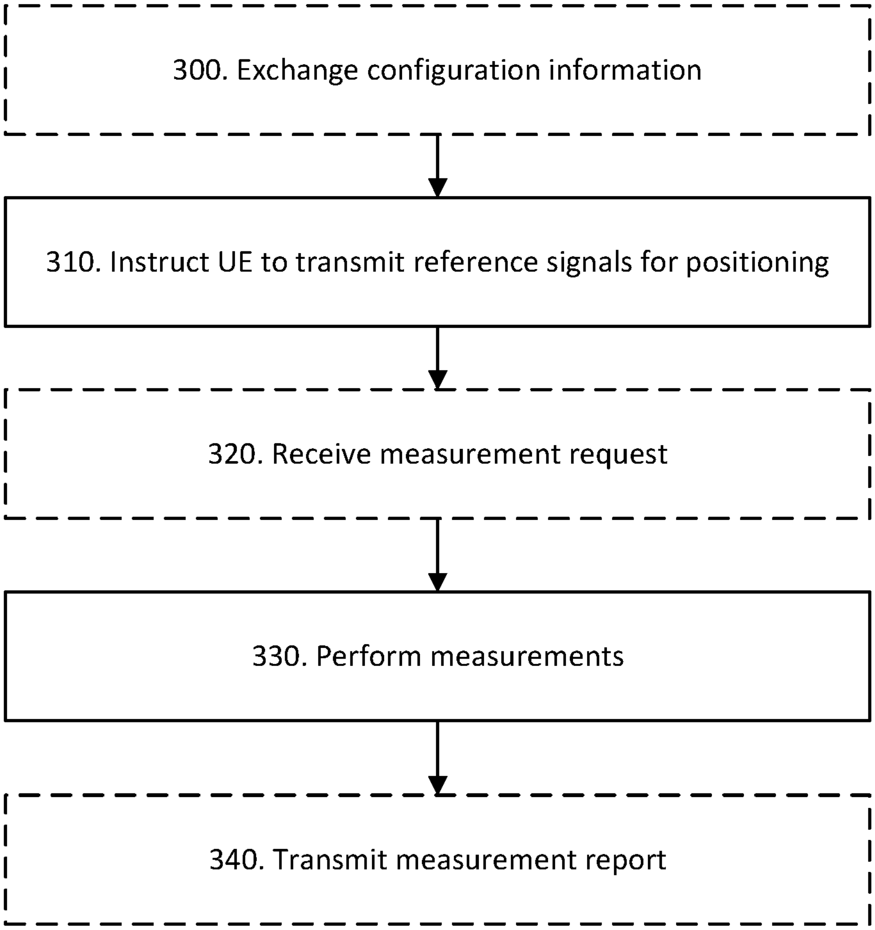
FIG. 7 is a flow chart illustrating a method which can be performed in an access node.

FIG. 7 is a flow chart illustrating a method which can be performed in an access node 120, such as a gNB/TRP as described herein. The method can include:

Step 300: Optionally, the access node can exchange configuration information with the network. This can include reference signal information such as UL SRS configuration information.

Step 310: The access node instructs a wireless device to transmit one or more reference signals for positioning. In some embodiments, the access node receives a request from a network node (e.g. LMF) to instruct the wireless device to transmit reference signals (e.g. UL SRS) for positioning purposes. In some embodiments, the access node can determine UL SRS resources in accordance with the configuration information and can transmit the appropriate RRC configuration information to one or more wireless device(s).

Step 320: The access node can optionally receive a measurement request message from a network node such as LMF 130. The measurement request message can include a request for phase difference measurements and/or AoA measurements. In some embodiments, the positioning measurement request can indicate to measure a plurality of AoA values and/or a plurality of additional paths.

Step 330: The access node performs positioning measurements. In some embodiments, the measurements include measuring received reference signals, such as UL SRS measurements. In some embodiments, the measurements can include phase difference measurement(s) and/or AoA measurements. In some embodiments, this can include measuring a plurality of AoA values for one or more channel path(s). In some embodiments, the access node determines uncertainties/ambiguities related to the AOA in accordance with the various embodiments described herein.

Step 340: The access node can optionally transmit a positioning measurement response message to the network node. The measurement report can include the plurality of AoA values and/or phase difference measurement(s). The measurement report can include an indication of uncertainty/ambiguity associated with the AoA and/or phase estimates. The response can be transmitted via NRPPa or F1AP signaling. In some embodiments, the response can include an LCS to GCS translation parameter for the plurality of AoA values.

It will be appreciated that one or more of the above steps can be performed simultaneously and/or in a different order. Also, steps illustrated in dashed lines are optional and can be omitted in some embodiments.

Figure 8:
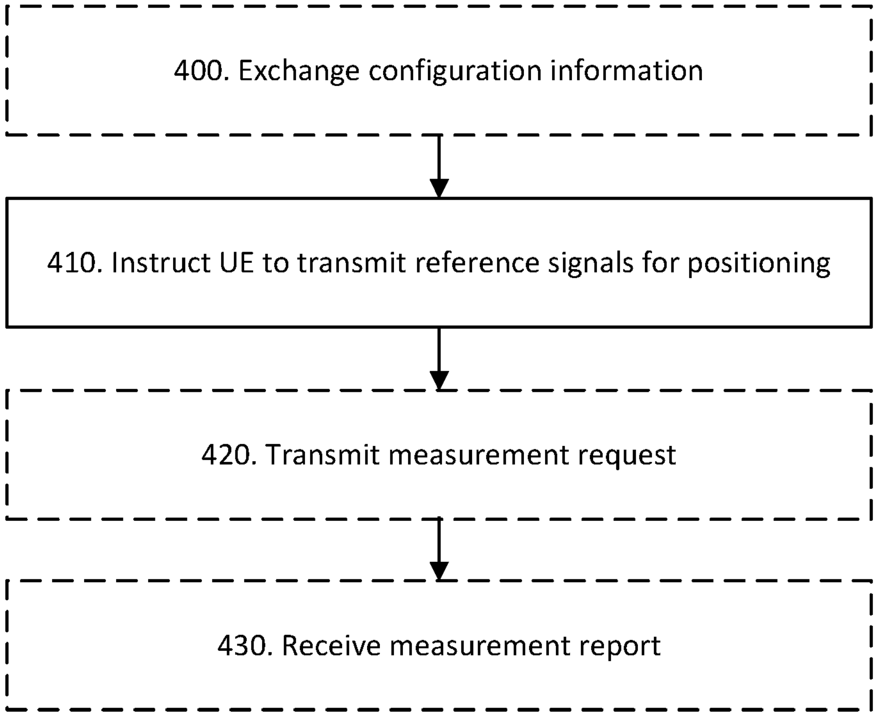
FIG. 8 is a flow chart illustrating a method which can be performed in a network node.

FIG. 8 is a flow chart illustrating a method which can be performed in a network node 130, such as a location server (e.g. LMF) as described herein. The method can include:

Step 400: Optionally, the network node can exchange configuration information with one or more access nodes. This can include reference signal information such as UL SRS configuration information. The network node can transmit a request UL SRS Configuration message to an access node.

Step 410: The network node instructs a wireless device to transmit reference signals for UL positioning. In some embodiments, the network node transmits a request to an access node indicating to instruct the wireless device to transmit reference signals (e.g. SRS) for positioning purposes. In response, the access node can determine UL SRS resources in accordance with the configuration information and can transmit the appropriate RRC configuration information to one or more wireless device(s). In other embodiments, the instruction to transmit reference signals for positioning measurements can be transmitted directly to one or more wireless device(s).

Step 420: The network node can optionally transmit a positioning measurement request message to one or more access node(s). The measurement request message can include a request for a plurality of phase difference measurements and/or AoA measurements.

Step 430: The network node can optionally receive a measurement response message from an access node. The measurement report can include the plurality of AoA values and/or phase difference measurement(s).

The measurement report can include an indication of uncertainty/ambiguity associated with the AoA and/or phase estimates. The response can be received via NRPPa signaling.

In some embodiments, the network node estimates a position of the wireless device in accordance with the positioning measurement response. In some embodiments, one or more of the received measurements (e.g. AoA values, phase difference estimates, etc.) can be excluded when estimating the position of the wireless device.

It will be appreciated that in some embodiments, the network node 130 can communicate (e.g. transmit/receive messages) directly with a wireless device 110. In other embodiments, messages and signals between the entities may be communicated via other nodes, such as radio access node (e.g. gNB, eNB) 120.

It will be appreciated that one or more of the above steps can be performed simultaneously and/or in a different order. Also, steps illustrated in dashed lines are optional and can be omitted in some embodiments.

Various embodiments have been described herein providing systems and methods for handling ambiguous AoA solutions. Some embodiments include signaling of estimated phase differences with uncertainty between consecutive antenna elements as opposed to the signaling of estimated AoA. Some embodiments include signaling of multiple AoA solutions with a determined uncertainty/ambiguity. Some embodiments include the exclusion of certain solutions based on different criteria such as e.g. the coverage area of the antenna elements. Some embodiments can provide for improved positioning performance, as the positioning node (e.g. LMF) can utilize the knowledge of alternative AoA solutions to position a UE.

Figure 9:
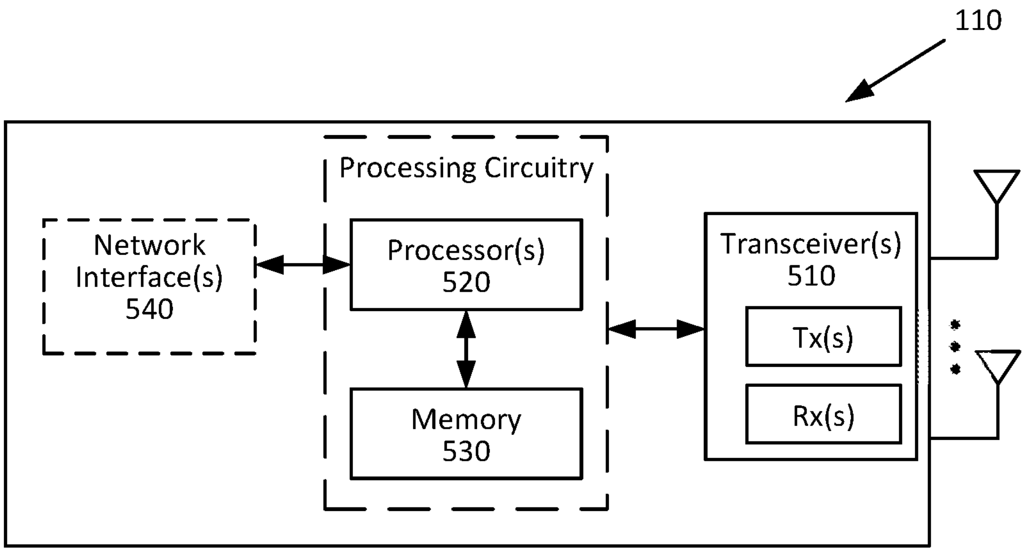
FIG. 9 is a block diagram of an example wireless device.

FIG. 9 is a block diagram of an example wireless device, UE 110, in accordance with certain embodiments. UE 110 includes a transceiver 510, processor 520, and memory 530. In some embodiments, the transceiver 510 facilitates transmitting wireless signals to and receiving wireless signals from radio access node 120 (e.g., via transmitter(s) (Tx), receiver(s) (Rx) and antenna(s)). The processor 520 executes instructions to provide some or all of the functionalities described above as being provided by UE, and the memory 530 stores the instructions executed by the processor 520. In some embodiments, the processor 520 and the memory 530 form processing circuitry.

The processor 520 can include any suitable combination of hardware to execute instructions and manipulate data to perform some or all of the described functions of a wireless device, such as the functions of UE 110 described above. In some embodiments, the processor 520 may include, for example, one or more computers, one or more central processing units (CPUs), one or more microprocessors, one or more application specific integrated circuits (ASICs), one or more field programmable gate arrays (FPGAs) and/or other logic.

The memory 530 is generally operable to store instructions, such as a computer program, software, an application including one or more of logic, rules, algorithms, code, tables, etc. and/or other instructions capable of being executed by a processor 520. Examples of memory 530 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by the processor 520 of UE 110.

Other embodiments of UE 110 may include additional components beyond those shown in FIG. 9 that may be responsible for providing certain aspects of the wireless device's functionalities, including any of the functionalities described above and/or any additional functionalities (including any functionality necessary to support the solution described above). As just one example, UE 110 may include input devices and circuits, output devices, and one or more synchronization units or circuits, which may be part of the processor 520. Input devices include mechanisms for entry of data into UE 110. For example, input devices may include input mechanisms, such as a microphone, input elements, a display, etc. Output devices may include mechanisms for outputting data in audio, video and/or hard copy format. For example, output devices may include a speaker, a display, etc.

Figure 10:
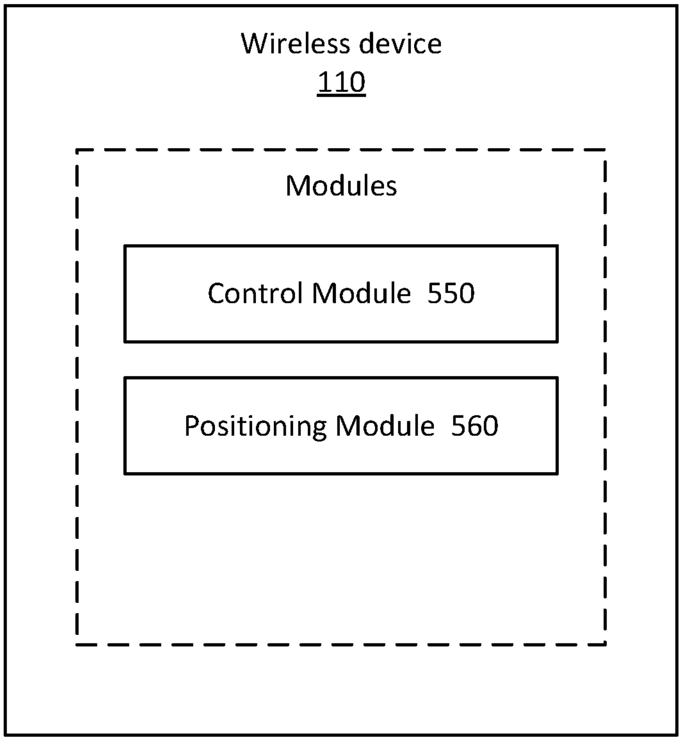
FIG. 10 is a block diagram of an example wireless device with modules.

In some embodiments, the wireless device UE 110 may comprise a series of modules configured to implement the functionalities of the wireless device described above. Referring to FIG. 10, in some embodiments, the wireless device 110 may comprise a control module 550 for receiving and interpreting control/configuration/capability information, a positioning module 560 for performing positioning measurements and calculating an estimated position.

It will be appreciated that the various modules may be implemented as combination of hardware and software, for instance, the processor, memory and transceiver(s) of UE 110 shown in FIG. 9. Some embodiments may also include additional modules to support additional and/or optional functionalities.

Figure 11:
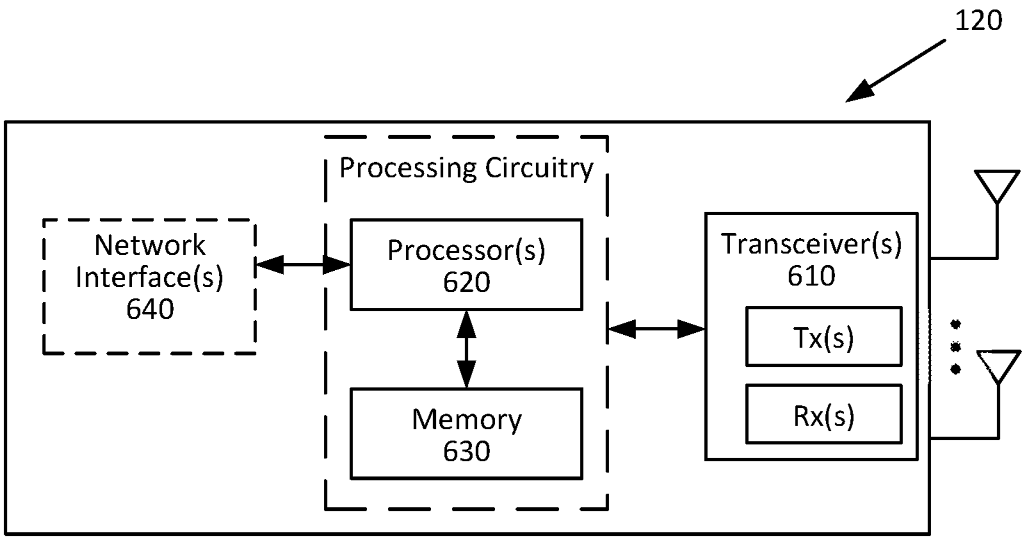
FIG. 11 is a block diagram of an example access node.

FIG. 11 is a block diagram of an exemplary access node 120. The exemplary node can be a gNB and/or TRP, in accordance with certain embodiments. Access node 120 may include one or more of a transceiver 610, processor 620, memory 630, and network interface 640. In some embodiments, the transceiver 610 facilitates transmitting wireless signals to and receiving wireless signals from wireless devices, such as UE 110 (e.g., via transmitter(s) (Tx), receiver(s) (Rx), and antenna(s)). The processor 620 executes instructions to provide some or all of the functionalities described above as being provided by access node 120, the memory 630 stores the instructions executed by the processor 620. In some embodiments, the processor 620 and the memory 630 form processing circuitry. The network interface 640 can communicate signals to backend network components, such as a gateway, switch, router, Internet, Public Switched Telephone Network (PSTN), core network nodes or radio network controllers, etc.

The processor 620 can include any suitable combination of hardware to execute instructions and manipulate data to perform some or all of the described functions of access node 120, such as those described above. In some embodiments, the processor 620 may include, for example, one or more computers, one or more central processing units (CPUs), one or more microprocessors, one or more application specific integrated circuits (ASICs), one or more field programmable gate arrays (FPGAs) and/or other logic.

The memory 630 is generally operable to store instructions, such as a computer program, software, an application including one or more of logic, rules, algorithms, code, tables, etc. and/or other instructions capable of being executed by a processor 620. Examples of memory 630 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, the network interface 640 is communicatively coupled to the processor 620 and may refer to any suitable device operable to receive input for node 120, send output from node 120, perform suitable processing of the input or output or both, communicate to other devices, or any combination of the preceding. The network interface 640 may include appropriate hardware (e.g., port, modem, network interface card, etc.) and software, including protocol conversion and data processing capabilities, to communicate through a network.

Other embodiments of access node 120 can include additional components beyond those shown in FIG. 11 that may be responsible for providing certain aspects of the node's functionalities, including any of the functionalities described above and/or any additional functionalities (including any functionality necessary to support the solutions described above). The various different types of network nodes may include components having the same physical hardware but configured (e.g., via programming) to support different radio access technologies, or may represent partly or entirely different physical components.

Processors, interfaces, and memory similar to those described with respect to FIG. 11 may be included in other network nodes (such as UE 110, radio access node 120, etc.). Other network nodes may optionally include or not include a wireless interface (such as the transceiver described in FIG. 13).

Figure 12:
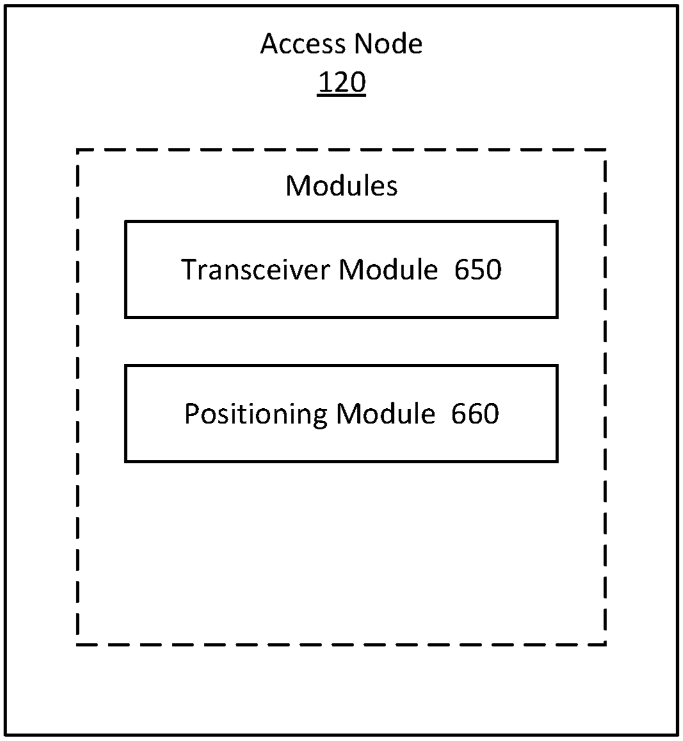
FIG. 12 is a block diagram of an example access node with modules.

In some embodiments, the access node 120, may comprise a series of modules configured to implement the functionalities of the network node described above. Referring to FIG. 12, in some embodiments, the access node 120 can comprise a transceiver module 650 for transmitting and receiving messages, such as capability requests/responses, configuration information exchange, positioning information requests and reports, etc. and a positioning module 660 for performing measurements include phase difference and/or AoA measurements and estimations.

It will be appreciated that the various modules may be implemented as combination of hardware and software, for instance, the processor, memory and transceiver(s) of access node 120 shown in FIG. 11. Some embodiments may also include additional modules to support additional and/or optional functionalities.

Figure 13:
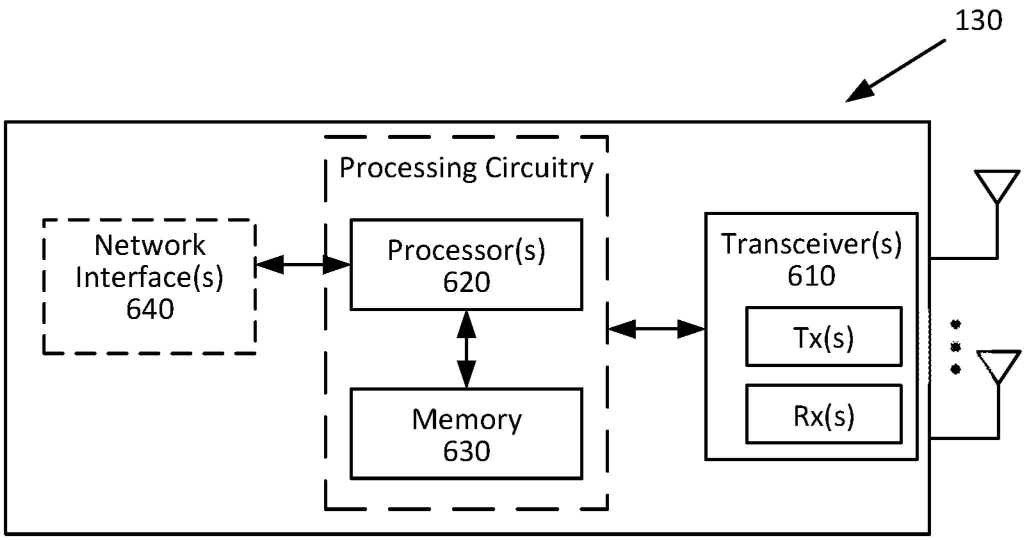

FIG. 13 is a block diagram of an exemplary network node 130. The exemplary node can be a location server and/or LMF, in accordance with certain embodiments. Network node 130 may include one or more of a transceiver 610, processor 620, memory 630, and network interface 640. In some embodiments, the transceiver 610 facilitates transmitting wireless signals to and receiving wireless signals from wireless devices, such as UE 110 (e.g., via transmitter(s) (Tx), receiver(s) (Rx), and antenna(s)). The processor 620 executes instructions to provide some or all of the functionalities described above as being provided by network node 130, the memory 630 stores the instructions executed by the processor 620. In some embodiments, the processor 620 and the memory 630 form processing circuitry. The network interface 640 can communicate signals to backend network components, such as a gateway, switch, router, Internet, Public Switched Telephone Network (PSTN), core network nodes or radio network controllers, etc.

The processor 620 can include any suitable combination of hardware to execute instructions and manipulate data to perform some or all of the described functions of network node 130, such as those described above. In some embodiments, the processor 620 may include, for example, one or more computers, one or more central processing units (CPUs), one or more microprocessors, one or more application specific integrated circuits (ASICs), one or more field programmable gate arrays (FPGAs) and/or other logic.

The memory 630 is generally operable to store instructions, such as a computer program, software, an application including one or more of logic, rules, algorithms, code, tables, etc. and/or other instructions capable of being executed by a processor 620. Examples of memory 630 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, the network interface 640 is communicatively coupled to the processor 620 and may refer to any suitable device operable to receive input for node 130, send output from node 130, perform suitable processing of the input or output or both, communicate to other devices, or any combination of the preceding. The network interface 640 may include appropriate hardware (e.g., port, modem, network interface card, etc.) and software, including protocol conversion and data processing capabilities, to communicate through a network.

Figure 14:
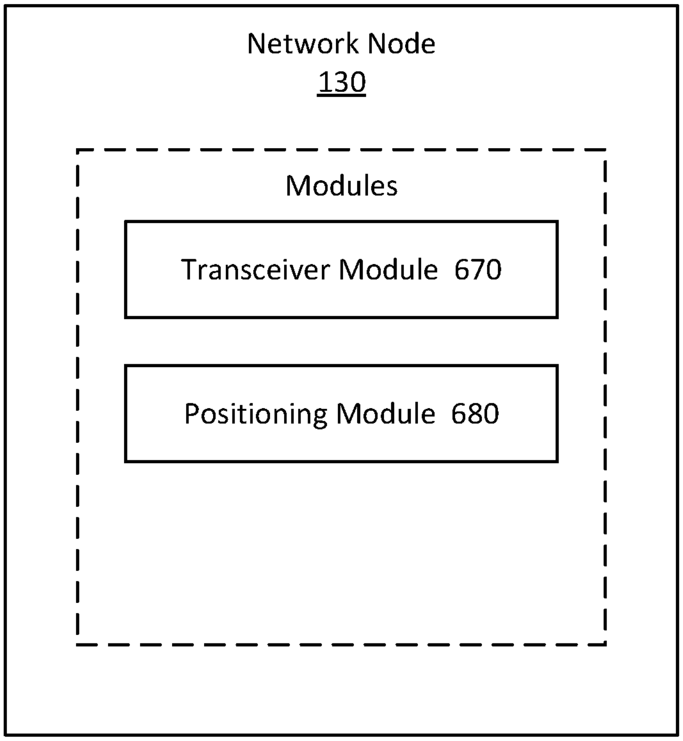

Other embodiments of network node 130 can include additional components beyond those shown in FIG. 14 that may be responsible for providing certain aspects of the node's functionalities, including any of the functionalities described above and/or any additional functionalities (including any functionality necessary to support the solutions described above). The various different types of network nodes may include components having the same physical hardware but configured (e.g., via programming) to support different radio access technologies, or may represent partly or entirely different physical components.

Processors, interfaces, and memory similar to those described with respect to FIG. 13 may be included in other network nodes (such as UE 110, radio access node 120, etc.). Other network nodes may optionally include or not include a wireless interface (such as the transceiver described in FIG. 13).

In some embodiments, the network node 130, may comprise a series of modules configured to implement the functionalities of the network node described above. Referring to FIG. 14, in some embodiments, the network node 130 can comprise a transceiver module 670 for transmitting and receiving messages, such as capability requests/responses, configuration information exchange, etc. and a positioning module 680 for transmitting, receiving and analyzing positioning information requests and reports.

It will be appreciated that the various modules may be implemented as combination of hardware and software, for instance, the processor, memory and transceiver(s) of network node 130 shown in FIG. 13. Some embodiments may also include additional modules to support additional and/or optional functionalities.

Figure 15:
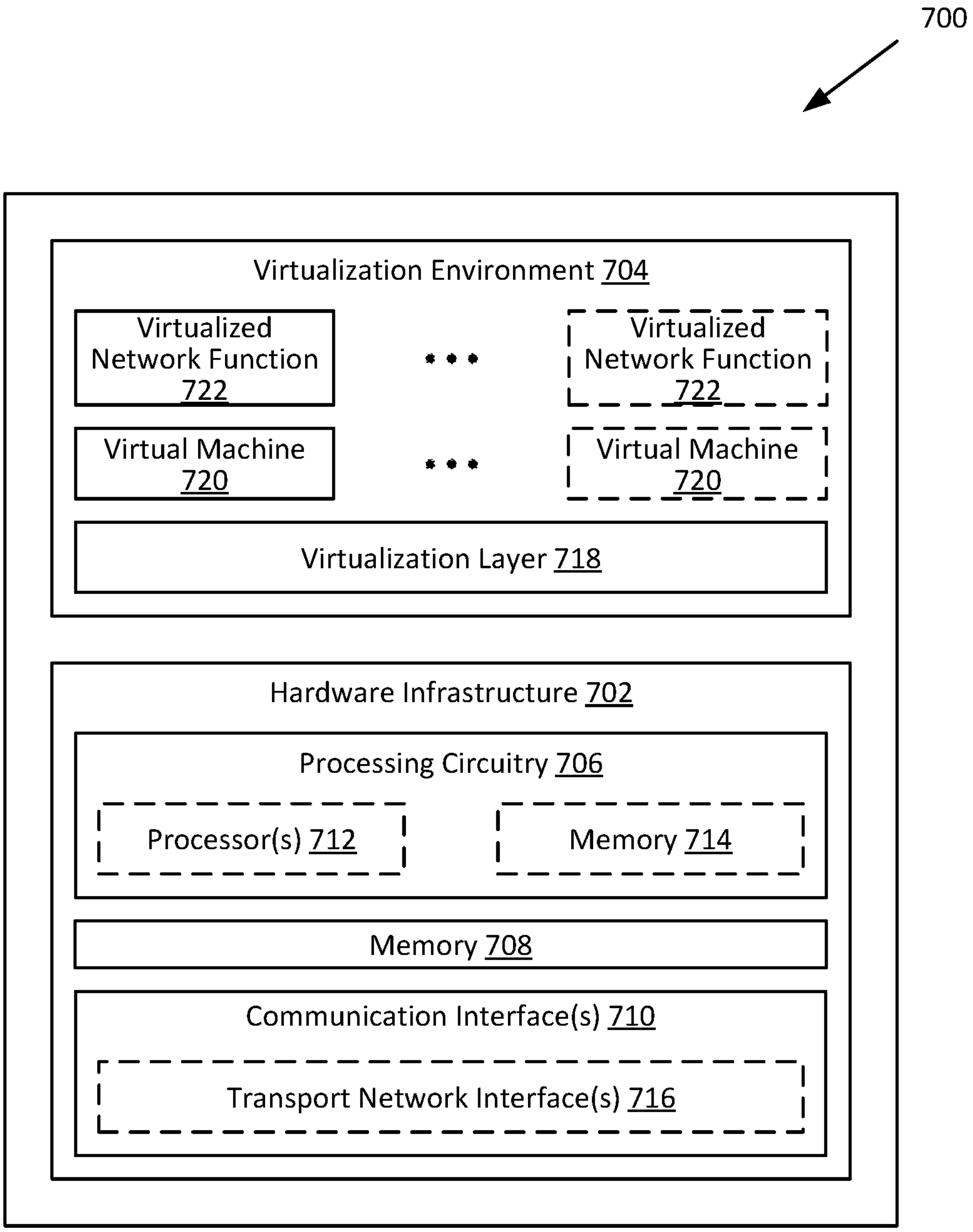
FIG. 15 is a block diagram of an example virtualized processing node.

Turning now to FIG. 15, some network nodes (e.g. UEs 110, radio access nodes 120, core network nodes 130, etc.) in the wireless communication network 100 may be partially or even entirely virtualized. As a virtualized entity, some or all the functions of a given network node are implemented as one or more virtual network functions (VNFs) running in virtual machines (VMs) hosted on a typically generic processing node 700 (or server).

Processing P node 700 generally comprises a hardware infrastructure 702 supporting a virtualization environment 704.

The hardware infrastructure 702 generally comprises processing circuitry 706, a memory 708, and communication interface(s) 710.

Processing circuitry 706 typically provides overall control of the hardware infrastructure 702 of the virtualized processing node 700. Hence, processing circuitry 706 is generally responsible for the various functions of the hardware infrastructure 702 either directly or indirectly via one or more other components of the processing node 700 (e.g. sending or receiving messages via the communication interface 710). The processing circuitry 706 is also responsible for enabling, supporting and managing the virtualization environment 704 in which the various VNFs are run. The processing circuitry 706 may include any suitable combination of hardware to enable the hardware infrastructure 702 of the virtualized processing node 700 to perform its functions.

In some embodiments, the processing circuitry 706 may comprise at least one processor 712 and at least one memory 714. Examples of processor 712 include, but are not limited to, a central processing unit (CPU), a graphical processing unit (GPU), and other forms of processing unit. Examples of memory 714 include, but are not limited to, Random Access Memory (RAM) and Read Only Memory (ROM). When processing circuitry 706 comprises memory 714, memory 714 is generally configured to store instructions or codes executable by processor 712, and possibly operational data. Processor 712 is then configured to execute the stored instructions and possibly create, transform, or otherwise manipulate data to enable the hardware infrastructure 702 of the virtualized processing node 700 to perform its functions.

Additionally, or alternatively, in some embodiments, the processing circuitry 706 may comprise, or further comprise, one or more application-specific integrated circuits (ASICs), one or more complex programmable logic device (CPLDs), one or more field-programmable gate arrays (FPGAs), or other forms of application-specific and/or programmable circuitry. When the processing circuitry 706 comprises application-specific and/or programmable circuitry (e.g., ASICS, FPGAs), the hardware infrastructure 702 of the virtualized processing node 700 may perform its functions without the need for instructions or codes as the necessary instructions may already be hardwired or preprogrammed into processing circuitry 706. Understandably, processing circuitry 706 may comprise a combination of processor(s) 712, memory(ies) 714, and other application-specific and/or programmable circuitry.

The communication interface(s) 710 enable the virtualized processing node 700 to send messages to and receive messages from other network nodes (e.g., radio network nodes, other core network nodes, servers, etc.). In that sense, the communication interface 710 generally comprises the necessary hardware and software to process messages received from the processing circuitry 706 to be sent by the virtualized processing node 700 into a format appropriate for the underlying transport network and, conversely, to process messages received from other network nodes over the underlying transport network into a format appropriate for the processing circuitry 706. Hence, communication interface 710 may comprise appropriate hardware, such as transport network interface(s) 716 (e.g., port, modem, network interface card, etc.), and software, including protocol conversion and data processing capabilities, to communicate with other network nodes.

The virtualization environment 704 is enabled by instructions or codes stored on memory 708 and/or memory 714. The virtualization environment 704 generally comprises a virtualization layer 718 (also referred to as a hypervisor), at least one virtual machine 720, and at least one VNF 722. The functions of the processing node 700 may be implemented by one or more VNFs 722.

Some embodiments may be represented as a software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause processing circuitry (e.g. a processor) to perform steps in a method according to one or more embodiments. Those of ordinary skill in the art will appreciate that other instructions and operations necessary to implement the described embodiments may also be stored on the machine-readable medium. Software running from the machine-readable medium may interface with circuitry to perform the described tasks.

The above-described embodiments are intended to be examples only. Alterations, modifications and variations may be affected to the particular embodiments by those of skill in the art without departing from the scope of the description.

Glossary

The present description may comprise one or more of the following abbreviation:

3GPP Third Generation Partnership Project
ACK Acknowledgement
AP Access point
ARQ Automatic Repeat Request
BS Base Station
BSC Base station controller
BSR Buffer Status Report
BTS Base transceiver station
CA Carrier Aggregation
CC Component carrier
CCCH SDU Common Control Channel SDU
CG Configured Grant
CGI Cell Global Identifier
CN Core network
CQI Channel Quality information
CSI Channel State Information
CU Central Unit
DAS Distributed antenna system
DC Dual connectivity
DCCH Dedicated Control Channel
DCI Downlink Control Information
DL Downlink
DMRS Demodulation Reference Signal
DU Distributed Unit
eMBB Enhanced Mobile Broadband eNB E-UTRAN NodeB or evolved NodeB
ePDCCH enhanced Physical Downlink Control Channel
E-SMLC evolved Serving Mobile Location Center
E-UTRA Evolved UTRA
E-UTRAN Evolved UTRAN
FDM Frequency Division Multiplexing
HARQ Hybrid Automatic Repeat Request
HO Handover
IAB Integrated Access Backhaul
IoT Internet of Things
LCH Logical channel
LTE Long-Term Evolution
M2M Machine to Machine
MAC Medium Access Control
MBMS Multimedia Broadcast Multicast Services
MCG Master cell group
MDT Minimization of Drive Tests
MeNB Master eNode B
MME Mobility Management Entity
MSC Mobile Switching Center
MSR Multi-standard Radio
MTC Machine Type Communication
NACK Negative acknowledgement
NDI Next Data Indicator
NR New Radio
O&M Operation and Maintenance
OFDM Orthogonal Frequency Division Multiplexing
OFDMA Orthogonal Frequency Division Multiple Access
OSS Operations Support System
PCC Primary Component Carrier
P-CCPCH Primary Common Control Physical Channel
PCell Primary Cell
PCG Primary Cell Group
PCH Paging Channel
PCI Physical Cell Identity
PDCCH Physical Downlink Control Channel
PDCP Packet Data Convergence Protocol
PDSCH Physical Downlink Shared Channel
PDU Protocol Data Unit
PGW Packet Gateway
PHICH Physical HARQ indication channel
PMI Precoder Matrix Indicator
ProSe Proximity Service
PSC Primary serving cell
PSCell Primary SCell
PUCCH Physical Uplink Control Channel
PUSCH Physical Uplink Shared Channel
RAT Radio Access Technology
RB Resource Block
RF Radio Frequency
RLC Radio Link Control
RLM Radio Link Management
RNC Radio Network Controller
RRC Radio Resource Control
RRH Remote Radio Head
RRM Radio Resource Management
RRU Remote Radio Unit
RSRP Reference Signal Received Power
RSRQ Reference Signal Received Quality
RSSI Received Signal Strength Indicator
RSTD Reference Signal Time Difference
RTT Round Trip Time
SCC Secondary Component Carrier
SCell Secondary Cell
SCG Secondary Cell Group
SCH Synchronization Channel
SDU Service Data Unit
SeNB Secondary eNodeB
SGW Serving Gateway
SI System Information
SIB System Information Block
SINR Signal to Interference and Noise Ratio
SNR Signal Noise Ratio
SPS Semi-persistent Scheduling
SON Self-organizing Network
SR Scheduling Request
SRS Sounding Reference Signal
SSC Secondary Serving Cell
TB Transport Block
TTI Transmission Time Interval
Tx Transmitter
UE User Equipment
UL Uplink
URLLC Ultra-Reliable Low Latency Communication
UTRA Universal Terrestrial Radio Access
UTRAN Universal Terrestrial Radio Access Network
V2V Vehicle-to-vehicle
V2X Vehicle-to-everything
WLAN Wireless Local Area Network

The invention claimed is:

1. A method performed by an access node, the method comprising:

transmitting, to a wireless device, an instruction to transmit reference signals for positioning measurements;

performing positioning measurements including measuring a plurality of Angle of Arrival (AoA) values for the reference signals for each of one or more channel paths; and transmitting, to a network node, a positioning measurement response including the plurality of AoA values for each of the one or more channel paths.

2. The method of claim 1, further comprising, receiving, from the network node, a positioning measurement request indicating to measure the plurality of AoA values.

3. The method of claim 2, wherein the positioning measurement request includes an indicator to report measurements for an extended additional path list.

4. The method of claim 1, wherein the positioning measurement response includes the plurality of AoA values in at least one of an additional path list and an extended additional path list.

5. The method of claim 1, wherein the positioning measurement response includes at least one of: a Transmission/Reception Point measurement result information element, an uplink Relative Time of Arrival measurement information element, and a gNB Rx-Tx Time Difference measurement information element.

6. The method of claim 1, wherein performing positioning measurements includes estimating a phase estimate and an uncertainty associated with the phase estimate.

7. The method of claim 1, wherein the positioning measurement response is transmitted over NR Positioning Protocol A (NRPPa).

8. The method of claim 1, wherein the positioning measurement response is transmitted over F1 Application Protocol (F1AP).

9. The method of claim 1, wherein the positioning measurement response includes one Local Coordinate System to Global Coordinate System (LCS to GCS) translation parameter for the plurality of AoA values.

10. An access node comprising a radio interface and processing circuitry configured to:

transmit, to a wireless device, an instruction to transmit reference signals for positioning measurements;

perform positioning measurements including measuring a plurality of Angle of Arrival (AoA) values for the reference signals for each of one or more channel paths; and transmit, to a network node, a positioning measurement response including the plurality of AoA values for each of the one or more channel paths.

11. The access node of claim 10, further configured to receive, from the network node, a positioning measurement request indicating to measure the plurality of AoA values.

12. The access node of claim 11, wherein the positioning measurement request includes an indicator to report measurements for an extended additional path list.

13. The access node of claim 10, wherein the positioning measurement response includes the plurality of AoA values in at least one of an additional path list and an extended additional path list.

14. The access node of claim 10, wherein the positioning measurement response includes at least one of: a Transmission/Reception Point measurement result information element, an uplink Relative Time of Arrival measurement information element, and a gNB Rx-Tx Time Difference measurement information element.

15. The access node of claim 10, wherein performing positioning measurements includes estimating a phase estimate and an uncertainty associated with the phase estimate.

16. The access node of claim 10, wherein the positioning measurement response is transmitted over NR Positioning Protocol A (NRPPa).

17. The access node of claim 10, wherein the positioning measurement response is transmitted over F1 Application Protocol (F1AP).

18. The access node of claim 10, wherein the positioning measurement response includes one Local Coordinate System to Global Coordinate System (LCS to GCS) translation parameter for the plurality of AoA values.

19. A method performed by a network node, the method comprising:

transmitting an instruction for a wireless device to transmit reference signals for positioning measurements;

transmitting, to an access node, a positioning measurement request; and receiving, from the access node, a positioning measurement response including a plurality of Angle of Arrival (AoA) values for each of one or more channel paths.

20. The method of claim 19, wherein the instruction for a wireless device to transmit reference signals for positioning measurements is transmitted to at least one of the access node and the wireless device.

21. The method of claim 19, wherein the positioning measurement request indicates to measure the plurality of AoA values.

22. The method of claim 19, wherein the positioning measurement request includes an indicator to report measurements for an extended additional path list.

23. The method of claim 19, wherein the positioning measurement response includes the plurality of AoA values in at least one of an additional path list and an extended additional path list.

24. The method of claim 19, wherein the positioning measurement response includes at least one of: a Transmission/Reception Point measurement result information element, an uplink Relative Time of Arrival measurement information element, and a gNB Rx-Tx Time Difference measurement information element.

25. The method of claim 19, further comprising, estimating a position of the wireless device in accordance with the positioning measurement response.

26. The method of claim 25, wherein at least one of the plurality of AoA values is excluded when estimating the position of the wireless device.

27. A network node comprising a radio interface and processing circuitry configured to:

transmit an instruction for a wireless device to transmit reference signals for positioning measurements;

transmit, to an access node, a positioning measurement request; and receive, from the access node, a positioning measurement response including a plurality of Angle of Arrival (AoA) values for each of one or more channel paths.

* * * * *